US 6,572,759 B1

(12) United States Patent
Nishimura et al.

(10) Patent No.: US 6,572,759 B1
(45) Date of Patent: *Jun. 3, 2003

(54) METHOD AND APPARATUS FOR TREATING AQUEOUS MEDIUM

(75) Inventors: Tatsuya Nishimura, Kanagawa (JP); Roberto Masahiro Serikawa, Kanagawa (JP); Oingquan Su, Kanagawa (JP); Masahiro Isaka, Kanagawa (JP); Takashi Usui, Kanagawa (JP)

(73) Assignee: Ebara Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/913,028

(22) PCT Filed: Feb. 10, 2000

(86) PCT No.: PCT/JP00/00743
§ 371 (c)(1),
(2), (4) Date: Aug. 9, 2001

(87) PCT Pub. No.: WO00/47519
PCT Pub. Date: Aug. 17, 2000

(30) Foreign Application Priority Data

| Feb. 10, 1999 | (JP) | ............ 11-032344 |
| Feb. 10, 1999 | (JP) | ............ 11-032347 |
| Feb. 10, 1999 | (JP) | ............ 11-033026 |
| Feb. 10, 1999 | (JP) | ............ 11-033400 |
| Feb. 10, 1999 | (JP) | ............ 11-033455 |

(51) Int. Cl.$^7$ ................................ C02F 1/461
(52) U.S. Cl. .................. 205/687; 205/688; 205/701; 205/742; 204/242; 204/275.1
(58) Field of Search ................... 205/687, 688, 205/701, 742; 204/242, 275.1

(56) References Cited

U.S. PATENT DOCUMENTS

| 3,798,150 A | 3/1974 | Gilchrist |
| 3,975,247 A | 8/1976 | Stralser |
| 4,389,288 A | 6/1983 | Vaughan |
| 4,405,420 A | 9/1983 | Vaughan |
| 4,416,956 A | 11/1983 | Lawless |
| 4,752,364 A | 6/1988 | Dhooge |
| 5,439,577 A | 8/1995 | Weres et al. |
| 6,348,143 B1 * | 2/2002 | Serikawa et al. ........... 205/742 |

FOREIGN PATENT DOCUMENTS

| EP | 0 535 320 | 4/1993 |
| FR | 2 780 986 | 1/2000 |
| JP | 50-155347 | 12/1975 |
| JP | 52-114570 | 9/1977 |
| JP | 08-052478 | 2/1996 |
| JP | 9-206796 | 8/1997 |
| JP | 09-215982 | 8/1997 |
| JP | 9-215982 | 8/1997 |
| WO | 88/00926 | 2/1988 |
| WO | 91/13834 | 9/1991 |
| WO | 99/07641 | 9/1998 |

OTHER PUBLICATIONS

Patent Abstracts of Japan, vol. 18, No. 219 (Apr. 1994) & JP 06 015253 (Jan. 1994) *Abstract*.
Database WPI, Section Ch, Week 198332, Derwent Publications Ltd., London, GB; AN 1983–733133 XP002203345 & SU 962 212 (Sep. 1982) *Abstract*.

* cited by examiner

Primary Examiner—Arun S. Phasge
(74) Attorney, Agent, or Firm—Wenderoth, Lind & Ponack, L.L.P.

(57) ABSTRACT

An object of the present invention is to provide a process and an apparatus for treating an aqueous medium at low running costs with a decreased electricity required for hydrothermal electrolytic reaction. The present invention proposes a two-step process comprising a first step of performing a conventional hydrothermal reaction or a conventional electrolytic reaction prior to hydrothermal electrolytic reaction to degrade readily degradable substances or ammonia or various electrolytically degradable organics and then a second step of performing hydrothermal electrolytic reaction to degrade the remaining organics, whereby the electricity consumed by hydrothermal electrolytic reaction in the second step can be greatly reduced.

33 Claims, 9 Drawing Sheets

METHOD AND APPARATUS FOR TREATING AQUEOUS MEDIUM

This application is a 371 application of PCT/JP00/00743 filed Feb. 10, 2000.

FIELD OF THE INVENTION

The present invention relates to aqueous medium treatment processes and apparatus, which can be used to treat organic wastewater, synthesize a product or recover a metal by efficiently performing hydrothermal reaction and electrolysis at the same time. As used herein, hydrothermal electrolysis means that hydrothermal reaction and electrolysis are performed at the same time.

PRIOR ART

Various kinds of waste liquors have been conventionally treated by hydrothermal reaction. Hydrothermal reaction means that an aqueous medium such as waste liquor is exposed to a pressure that allows said aqueous medium to be kept in the liquid phase at high temperature below the critical temperature of the aqueous medium, whereby reducing substances such as organics are degraded at high temperature.

However, waste liquors could not be treated at sufficient efficiency by conventional hydrothermal reaction processes.

Thus, we proposed an efficient waste liquor treatment process by hydrothermal electrolysis (International Application PCT/JP 98/03544 filed Aug. 10, 1998; see International Publication WO99/07641). Said hydrothermal electrolysis is a process for effectively oxidatively degrading reducing substances such as organics (including synthetic polymers) or ammonia by performing hydrothermal reaction and electrolysis at the same time in the presence of water at high temperature and high pressure. The disclosure of International Publication WO99/07641 is incorporated herein as a whole as reference.

Although this hydrothermal electrolytic reaction is useful as a process for very effectively degrading reducing substances, later studies revealed that a large electricity is required for the treatment of waste liquor. That is, it is necessary to increase the electrolytic current, and therefore to increase the area of electrolytic electrodes in order to continuously and rapidly treat a large amount of waste liquor by hydrothermal electrolytic reaction. However, it is not always easy to increase the area of electrodes in a reaction vessel, which should be exposed to high temperature and high pressure of hydrothermal electrolytic reaction. Therefore, how to increase the electrolytic current in a limited electrode area was a great issue for increasing the throughput in said treatment process.

Possible electrode reactions that can proceed in hydrothermal electrolytic reaction are described below. However, the present invention is not bound to the theory described below. At the anode, reactions (1), (2), (3) below seem to proceed.

$$2O^{2-} \rightarrow O_2\uparrow + 4e^- \quad (1)$$

$$H_2O \rightarrow 2H^+ + 1/2O_2\uparrow + 2e^- \quad (2)$$

$$\text{Organic} + H_2O \rightarrow CO_2\uparrow + H^+ + e^- \quad (3)$$

When a halide ion exists in the aqueous medium, a halogen molecule is produced by the formula below.

$$2X^- \rightarrow X_2 + 2e^- \quad (4)$$

where X represents a halogen atom.

In formula (1), the molecular oxygen produced serves as an oxidizer. In formula (1), a very active chemical species such as atomic oxygen seems to be produced as the molecular oxygen is produced at the interface between the anode and the electrolyte. In formula (4), a halide ion is oxidized to produce a halogen molecule. When X is a chlorine atom, for example, chlorine gas is produced. In formula (2), water is electrolyzed to produce oxygen gas. In formula (3), an organic is directly oxidized at the anode. The reaction of formula (4) and the reaction of formula (2) compete with each other and which reaction prevails depends on the type of the anode, the halide ion concentration in the aqueous medium and other factors. For example, the reaction of formula (4) prevails when a chlorine-generating electrode is used at a specific halide ion concentration or more.

The halogen molecule produced at the interface between the anode and the electrolyte by formula (4) reacts with its neighboring water to produce a hypohalous acid and a hydrogen halide.

$$X_2 + H_2O \rightarrow HX + HXO \quad (5)$$

where X has the meaning as defined above.

Hypohalous acids are excellent oxidizers capable of oxidatively degrading reducing substances contained in aqueous media. When the reducing substance is an organic, for example, the organic seems to be oxidized by the reaction below.

$$\text{Organic} + HXO \rightarrow CO_2\uparrow + H_2O \text{ HX} \quad (6)$$

where X has the meaning as defined above.

When the reducing substance is ammonia, ammonia seems to be oxidized by the reaction below.

$$2NH_3 + 3HXO \rightarrow N_2\uparrow + 3HX + 3H_2O \quad (7)$$

Hypohalous acids are excellent oxidizers especially in acidic solutions and hydrogen ion is produced by formulae (2), (3) or the like to tend to form an acidic environment near the anode at which a hypohalous acid is produced. Thus, the hypohalous acid seems to especially favorably act as an oxidizer near the anode.

When X is a chlorine atom, the oxidation reaction by the hypohalous acid seems to especially participate in the degradation of reducing substances.

When X is a bromine atom or an iodine atom, the halate ion may participate in the degradation of reducing substances. Hypohalite ions disproportionate in basic solutions to produce a halate ion and a halide ion.

$$3XO^- \rightarrow 2X^- + XO^{3-} \quad (8)$$

For example, the reaction of formula (8) may occur when the hypohalous acid moves toward the cathode by diffusion or the like. This is because hydroxide ion is produced by anodic reaction to tend to form a basic environment near the cathode. The rate of the disproportionation reaction of formula (8) is higher in the order of chlorine, bromine and iodine, and a halate ion can be quantitatively obtained with bromine and iodine (F. A. Cotton, G. Wilkinson, P. L. Gaus, "Basic Inorganic Chemistry", Baifukan, 1991, 2nd ed., p. 379). Halic acids are strong acids and potent oxidizers.

In formula (2), oxygen gas is produced by the electrolysis of water. Here, an oxygen atom seems to be first produced at the interface between the anode and the electrolyte. Said oxygen atom has a higher activity as an oxidizer than molecular oxygen so that it can efficiently oxidize reducing substances. Even if molecular oxygen is produced, reducing substances can be oxidized by hydrothermal oxidation reaction.

When the reducible substance is an organic, oxidation reaction by oxygen proceeds by the formula below.

$$\text{Organic} + O_2 \rightarrow CO_2\uparrow + H_2O \quad (9)$$

As shown by formula (3), reducing substances such as organics or ammonia may be directly oxidized at the anode by electrode reaction. When the reducing substance is ammonia, for example, the reaction of the formula below may proceed.

$$2NH_3 \rightarrow N_2\uparrow + 6H^+ + 6e^- \quad (10)$$

Thus, hydrothermal electrolysis according to the present invention includes many reaction mechanisms by which reducing substances are efficiently oxidatively degraded at or near the anode.

On the other hand, possible reactions at the cathode are as follows.

Water is electrolyzed to produce hydrogen at the cathode.

$$2H_2O + 2e^- \rightarrow H_2\uparrow + 2OH^- \quad (11)$$

Here, the so-called cathodic protection against corrosion can be provided by using the reactor body as a cathode.

A reaction may also proceed in which an oxidizer is reduced at the cathode. The oxidizer here includes an oxidizer produced at the anode such as a hypohalous acid and optionally an externally added oxidizer. Examples of reaction are shown by formulae (12), (13), (14) and (15) below.

The hypohalous acid is reduced at the cathode.

$$HXO + e^- \rightarrow X^- + OH^- \quad (12)$$

Oxygen dissolved in the aqueous medium represented by $O_2(aq)$ in the formulae below is also reduced.

$$1/2 O_2(aq) + H_2O + 2e^- \rightarrow 2OH^- \quad (13)$$

Another possible reaction of cathodic reduction of dissolved oxygen is as follows.

$$O_2(aq) + H_2O + e^- \rightarrow \text{active oxygen} + OH^- \quad (14)$$

If hydrogen peroxide exists, it is reduced at the cathode.

$$H_2O_2 + 2e^- \rightarrow 2OH^- \quad (15)$$

At the cathode, the reactions of formulae (12), (13), (14) and (15) in which an oxidizer is reduced compete with the reaction of formula (11) in which hydrogen is generated.

Our experiments revealed that the reactions of formulae (12), (13), (14) and (15) in which an oxidizer is reduced proceed preferentially to the reaction in which hydrogen is generated in hydrothermal electrolysis, and especially the reaction of formula (14) in which active oxygen is produced actively proceeds. Correspondingly, hydrogen generation is inhibited in hydrothermal electrolysis to reduce the possibility of coexistence of oxygen gas and hydrogen gas in the reactor and thus to reduce the danger of explosion. The oxidizer such as a hypohalous acid is degraded at the cathode to eliminate the secondary treatment for detoxifying the oxidizer in the effluent. For example, a hypohalite ion is generated at a high concentration during electrolysis at room temperature. However, the generation of a hypohalite ion was scarcely detected during electrolysis at high temperature.

It is thought that reducing substances such as organics or ammonia are oxidatively degraded by hydrothermal electrolytic reaction according to the reaction mechanisms as described above to inhibit the generation of hydrogen gas or oxygen gas.

Thus, hydrothermal electrolytic reaction involves electrolyzing an aqueous medium containing water, a halide ion such as chloride ion and reducing substances such as organics or ammonia at specific high temperature and high pressure to oxidatively degrade the reducing substances. In electrolysis, oxidation reaction proceeds at the anode to produce oxygen gas and a halogenic oxidizer such as a hypohalous acid. Generally, oxidation reaction readily proceeds in the presence of an oxidizer such as oxygen gas at high temperature and high pressure of hydrothermal reaction. In hydrothermal electrolytic reaction according to the process of the present invention, reducing substances such as organics or ammonia can be effectively oxidatively degraded by performing hydrothermal reaction and electrolysis at the same time.

Moreover, persistent substances could be treated at high degradation efficiency with a nascent oxidizer produced in situ in the hydrothermal electrolytic reactor such as an active species produced during the generation of molecular oxygen in formula (1). When an external oxidizer such as oxygen in the air was directly introduced into the reaction site of this hydrothermal electrolysis, this external oxidizer having low electrochemical activity could be converted into active oxygen having high activity to further improve the efficiency of this degradative reaction.

However, nascent oxidizers or active oxygen electrochemically produced in the reactor entail higher production costs as compared with normal oxidizers (external oxidizers), though they have high activity. The amount of internal oxidizers produced depends on the electricity so that enormous electricity is needed if reducing substances contained in an aqueous medium are wholly treated with internally produced oxidizers alone. On the contrary, external oxidizers, especially compressed air or the like can be introduced into the hydrothermal reaction site at low running costs involving only power costs for the motor of the compressor for compressing air.

Generally, aqueous media contain various reducing substances including persistent substances which are difficult to degrade with external low-activity oxidizers (air, oxygen, hydrogen peroxide, ozone, hypohalous acids, etc.) and readily degradable substances which are readily degradable with such external oxidizers. Said readily degradable substances include, for example, t-butyl alcohol, formic acid, oxalic acid, phenol, o-cresol and benzyl alcohol, and said persistent substances include, for example, acetic acid, propionic acid, succinic acid, adipic acid, propylene glycol and polyethylene glycol 200. Aqueous media contain ammonia and various organics that are degradable by electrolysis under normal temperature and atmospheric pressure conditions. When these readily degradable substances or electrolytically degradable ammonia or various organics exist at the hydrothermal electrolytic reaction site, they consume nascent oxidizers or active oxygen to increase power consumption of the hydrothermal electrolytic reactor. High-activity electrochemical oxidizers internally produced in hydrothermal electrolytic reaction are consumed to degrade not only persistent substances but also readily degradable substances or electrolytically degradable ammonia or various organics, thus increasing power consumption for hydrothermal electrolysis and therefore running costs of the aqueous medium treatment process.

Thus, an object of the present invention is to provide a process and an apparatus for treating an aqueous medium at low running costs with decreased electricity required for hydrothermal electrolytic reaction.

SUMMARY OF THE INVENTION

As a result of careful studies to attain the above object, we accomplished the present invention on the basis of the finding that a two-step process comprising a first step of performing a conventional hydrothermal reaction or a conventional electrolytic reaction prior to hydrothermal electrolytic reaction to degrade readily degradable substances or ammonia or various electrolytically degradable organics as described above and a-second step of performing hydrothermal electrolytic reaction to degrade the remaining organics is effective to remarkably reduce the electricity consumed by the hydrothermal electrolytic reaction in the second step.

THE MOST PREFERRED EMBODIMENTS OF THE INVENTION

Figure 1:
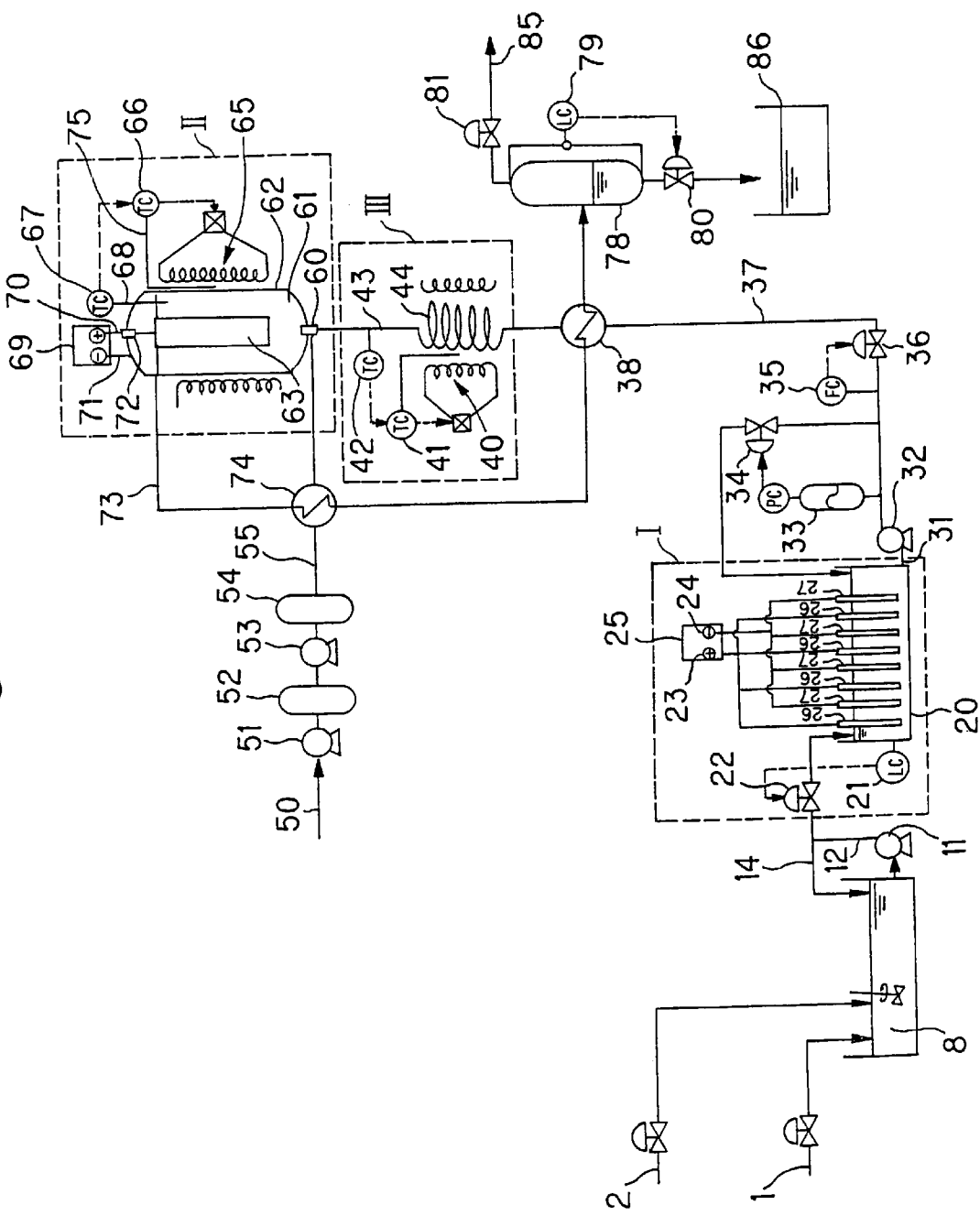
FIG. 1 is a schematic view showing the general structure of an aqueous medium treatment apparatus according to a first aspect of the present invention.

Various aspects of the present invention are described below.

A first aspect of the present invention relates to a process for treating an aqueous medium comprising:

a first step of subjecting an aqueous medium containing water, reducing substances and a halide ion to electrolytic reaction under the conditions of a temperature of 100° C. or less and atmospheric pressure, and then a second step of performing hydrothermal electrolysis by supplying a direct current to said aqueous medium at a temperature of 100° C. or more but not more than the critical temperature of said aqueous medium and at a pressure that allows said aqueous medium to be kept in the liquid phase.

The first aspect of the present invention also relates to an apparatus for treating an aqueous medium comprising:

an electrolytic reactor having a vessel for receiving an aqueous medium and at least a pair of electrodes for performing electrolysis in said vessel, and a hydrothermal electrolytic reactor having a reactor having an inlet for introducing the aqueous medium treated by said electrolytic reactor and an outlet for discharging effluent and capable of resisting the pressure of hydrothermal reaction, and at least a pair of electrodes for performing electrolysis in said reactor.

As defined herein, the process according to the first aspect of the present invention comprises a first step of subjecting an aqueous medium containing water, reducing substances and a halide ion to electrolytic reaction under the conditions of a temperature of 100° C. or less and atmospheric pressure to degrade ammonia or a part of completely or partially degradable organics, and then a second step of performing hydrothermal electrolysis by supplying a direct current to said aqueous medium at a temperature of 100° C. or more but not more than the critical temperature of said aqueous medium and at a pressure that allows said aqueous medium to be kept in the liquid phase to completely degrade the remaining reducing substances.

In the electrolytic reaction performed as a first step under the conditions of a temperature of 100° C. or less and atmospheric pressure, many of the reactions shown by the formulae above may theoretically occur but actually do not proceed without a significantly large amount of current, eg, the reactions of formulae (13) and (15) do not seem to readily proceed under current conditions allowable in conventional equipments. The anodic reaction of formula (14) in which active oxygen is produced also seems to proceed only slightly in normal pressure electrolysis. The oxidation reaction of formula (9) seems to scarcely proceed under the conditions of 100° C. or less and atmospheric pressure. In the first step of electrolytic reaction of the present invention, the following reactions are thought to prevail: halogen molecule-producing reaction of formula (4), water decomposition reaction of formula (2), hypohalous acid-producing reaction of formula (5), oxidative degradation of ammonia by a hypohalous acid of formula (7) and hydrogen-producing reaction of formula (11). Oxidative degradation reaction of an organic by a hypohalous acid of formula (6) also seems to partially occur.

In the second step of hydrothermal electrolytic reaction, a hydrothermal reaction takes place at a temperature of 100° C. or more but not more than the critical temperature of said aqueous medium and at a pressure that allows said aqueous medium to be kept in the liquid phase to oxidatively degrade reducing substances via reactions of formulae (1) to (15) above. In hydrothermal electrolytic reaction, temperatures lower than 100° C. are not preferred because the rate of hydrothermal reaction is lowered to extend the reaction time. However, the finding of the present invention cannot be directly applied for temperatures higher than the critical temperature because physical properties of the aqueous media significantly change. At the supercritical state, for example, the solubility of the electrolyte such as a halide ion greatly decreases and electric conductivity is decreased. In the present invention, the second step of hydrothermal electrolytic reaction preferably takes place at a temperature of 120–370° C., more preferably 140–370° C. The reaction pressure in hydrothermal electrolytic reaction is preferably in the range of 10–220 atm.

Preferably, the second step of hydrothermal electrolytic reaction of the process according to the first aspect of the present invention further comprises the step of adding an oxidizer to the aqueous medium. The oxidizer may be added to the aqueous medium in the hydrothermal electrolytic reactor. The oxidizer may be added first to the aqueous medium to be sent to the hydrothermal electrolytic reactor and then the aqueous medium may be introduced into the reactor. The existence of an oxidizer in hydrothermal electrolysis inhibits the generation of hydrogen at the cathode. That is, reduction reaction of the oxidizer seems to preferentially occur to hydrogen generation reaction. The electric power necessary for electrolysis can be reduced as compared with the case where no oxidizer is added.

Oxidizers that can be externally added for this purpose are preferably oxygen gas, ozone gas, hydrogen peroxide and hypohalous acids, more preferably oxygen gas. Oxygen gas may be a gas containing oxygen gas, eg, air is preferably used. Oxidizers may also be liquid oxidizers such as hypohalous acids, dissolved ozone or hydrogen peroxide.

The amount of oxidizers externally added herein preferably corresponds to 0.01–100 equivalents of the chemical oxygen demand (COD) of the aqueous medium. If the oxidizer level is less than 0.01 equivalents, the COD of the aqueous medium cannot be sufficiently decreased and more electric power is needed for electrolysis. If the oxidizer level is more than 100 equivalents, however, the oxidizer is uselessly consumed in an amount more than required for the oxidation of reducing substances in the aqueous medium. Therefore, the oxidizer level is preferably 10 equivalents or less, more preferably 5 equivalents or less, most preferably 2 equivalents or less of the COD of the aqueous medium in order to decrease the COD of the aqueous medium.

The COD here measures the oxygen equivalent of organics in a sample. For example, a sample of aqueous medium is refluxed with a known amount of potassium dichromate in sulfuric acid for 2 hours. Before refluxing, silver sulfate is added to oxidize straight-chain compounds and mercury sulfide is added to prevent oxidation of chloride ion. The COD of the aqueous medium can be determined by titrating unreacted potassium dichromate against ammonium iron sulfate standard.

In the process according to the first aspect of the present invention, the influent aqueous medium should contain a halide ion. The halide ion may be initially contained in the aqueous medium or externally added.

Suitable halide ions for use in the present invention include chloride ion ($Cl^-$), bromide ion ($Br^-$), iodide ion ($I^-$) or any combination thereof, among which chloride ion or bromide ion is especially preferred. A halide ion-producing salt may be dissolved in the aqueous medium. An acid such as hydrogen chloride (HCl), hydrogen bromide (HBr) or hydrogen iodide (HI) may be contained in the aqueous medium.

The halide ion-producing salt may be an inorganic or organic salt. For example, a salt of an acid such as hydrogen chloride (HCl), hydrogen bromide (HBr) or hydrogen iodide (HI) with a base is preferably used. Inorganic salts include, for example, alkali metal halides such as sodium chloride, potassium chloride; alkali earth metal halide such as calcium chloride; ammonium halides such as ammonium chloride; and complex salts such as tris(ethylenediamine) cobalt (III) chloride, tris(2,2'-bipyridine) iron (II) bromide. Organic salts include tetraalkylammonium halides such as tetraethylammonium chloride. Addition salts of amines and hydrogen halides (eg, aniline/hydrogen chloride) are also suitable. Wastewater derived from municipal waste or chlorine-containing polymers such as polyvinyl chloride or polyvinylidene chloride contains overwhelmingly much chloride ion among other halide ions.

The aqueous medium preferably contains 0.05 mmol/l or more of a halide ion, more preferably 0.5 mmol/l or more of a halide ion, most preferably 5 mmol/l or more of a halide ion. This is because the halide ion produces a hypohalous acid via the electrolysis of the aqueous medium to oxidize reducing substances in the aqueous medium.

The aqueous medium preferably contains 0.05 mmol/l or more of chloride ion ($C^-$), more preferably 0.5 mmol/l or more of chloride ion, most preferably 5 mmol/l or more of chloride ion.

When a halide ion is externally added, it is preferably added into the aqueous medium before the first step of electrolytic reaction. In the first step of electrolytic reaction, the halide ion is converted into a hypohalous acid via cathodic reaction so that this hypohalous acid oxidizes or chlorinates reducing substances susceptible to chlorination attack. In this first step of electrolysis, typically little substances can be completely degraded (with special exceptions such as ammonia) but partial oxidation and chlorination prevail to result in a relatively low TOC degradation. Some organics produce less favorable organic chlorine compounds by the attack of the hypohalous acid. However, these partial oxides and organic chlorine compounds are completely degraded by the later step of hydrothermal electrolysis and cannot remain.

Next, an embodiment of the process for treating an aqueous medium according to the first aspect of the present invention is explained with reference to the attached drawings. FIG. 1 is a flow sheet showing an embodiment of an aqueous medium treatment apparatus according to the first aspect of the present invention.

The aqueous medium treatment apparatus shown in FIG. 1 has a first section for electrolysis (I), a second section for hydrothermal electrolysis (II) and a heating section for heating the aqueous medium treated in the first section for electrolysis to a temperature favorable for hydrothermal electrolytic reaction (III).

An aqueous medium to be treated is first introduced into aqueous medium-conditioning tank 8 via aqueous medium line 1 and mixed with a halide supplied via halide line 2 in this tank. Then, the conditioned aqueous medium is transferred via line 12 by aqueous medium-transporting pump 11 into electrolytic reaction cell 20. Supply of the aqueous medium is controlled by flow control valve 22 associated with liquid level controller 21, whereby the liquid level in electrolytic reaction cell 20 is controlled. An excess of the aqueous medium is returned to aqueous medium conditioning tank 8 via line 14. In electrolytic reaction cell 20, a plurality of anodes 26 and cathodes 27 are alternately arranged and connected to cathode 23 and anode 24 of a dc source 25, respectively. Thus, the aqueous medium is electrolyzed to degrade ammonia and some organics.

Materials for electrolytic reaction cell 20 may be those commonly used in the art for electrolytic reaction cell at normal temperature and normal pressure, such as plastics such as FRP, PVC, Teflon, acrylic resins, or concrete, or metal materials.

Materials for electrodes are preferably those commonly used for the purpose of electrolytic reaction, such as materials having ruthenium, iridium, platinum, palladium, rhodium, tin or an oxide thereof or a ferrite on their surface. For example, electrodes themselves may be made from these materials. Alternatively, the base material of electrodes may be coated with these materials on the surface.

Ruthenium, iridium, platinum, palladium, rhodium and tin may be elemental metals or oxides. Alloys of these metals are also preferably used. Such alloys include, for example, platinum-iridium, ruthenium-tin and ruthenium-titanium. These metals show high corrosion resistance, excellent insolubility for use as an anode and high generation efficiency of a halogen molecule such as chlorine gas. Especially preferred chlorine-generating electrodes are based on palladium, ruthenium or an alloy of platinum and iridium. Materials used for cathodes are not required to have strict insolubility, so that they may be stainless steel, carbon steel, titanium or titanium-based alloys, nickel alloys such as Hastelloy and Inconel.

The current density at the anode in electrolytic reaction cell 20 is preferably 0.1 mA/dm$^2$–500 A/dm$^2$. If the current density is higher than 500 A/dm$^2$, the surface of the anode is liable to be exfoliated or dissolved. If the current density is lower than 0.1 mA/dm$^2$, however, the area of the anode must be increased and the system becomes bulky. The current density is more preferably 10 mA/dm$^2$–100 A/dm$^2$, most preferably 100 mA/dm$^2$–50 A/dm$^2$. If a new material for the anode is developed, the current density at the anode can be further increased.

The temperature of the aqueous medium in electrolytic reaction cell 20 is preferably 100° C. or less, more preferably in the range of 30–80° C.

Electrolytic reaction cell 20 should be an open system and constantly purged with air to remove any gas produced in the reaction cell such as hydrogen and oxygen.

The aqueous medium treated in electrolytic reaction cell 20 is transiently stored in a receiver tank or buffer tank not shown and then drawn from this tank to high-pressure pump 32 via line 31. In high-pressure pump 32, the aqueous medium is pressurized to a pressure about 3 MPa higher than the reaction pressure in hydrothermal electrolytic reaction vessel 62 of the second step. This pressure control is accomplished with a pressure controller. That is, when the pressure exceeds the reaction pressure plus 3 MPa by pressurization in high-pressure pump 32, valve 34 moves to the open direction to lower the pressure. Thus, the pressure on the outlet side of the pump is always kept constant. Pressure variation in high-pressure pump 32 for pressurizing liquid can be absorbed by accumulator 34 holding a gas, so that smooth pressure control can be ensured by valve 34. This constant pressure on the outlet side of the pump is necessary for smooth operation of flow controller 35. In the present invention, the sensor of the flow controller may be either of an orifice type or a heat conduction type used in mass flow controllers, but may indicate an error value if the line including the flow sensor is not kept at a constant pressure. Flow controller 35 activates flow control valve 36 to circulate the aqueous medium through line 37 at a predetermined flow rate.

Then, the aqueous medium is preferably warmed via heat exchanger 38 and then heated in heating section (III). In the embodiment shown in FIG. 1, it is heated in heater 40. The line is preferably coiled (44) to increase heating efficiency in the heater. The temperature in the heater and the temperature of the heated material at the exit of the heater are desirably measured by temperature sensors 41 and 42 to control heating. The aqueous medium is desirably heated to a predetermined reaction temperature in hydrothermal electrolytic reaction vessel 62. In the present invention, the heater is not limited to an electric heater, but may also be an existing fluid heating system such as an oil burner heating system or a thermal fluid heating system.

Separately from the aqueous medium, oxidizer line 55 for supplying oxidizer 50 to hydrothermal electrolytic reaction vessel 62 is preferably provided. Suitable oxidizers include, for example, oxygen gas-containing gases such as air. In the embodiment shown in FIG. 1, oxidizer line 55 has an oxidizer injection line 50, a compressor 51, an accumulator 52 for storing the oxidizer, a high-pressure compressor 53 for pressurizing the oxidizer stored in accumulator 52 to a pressure higher than the reaction pressure, an accumulator 54 for storing the pressurized oxidizer, and a heat exchanger 74 for preheating the pressurized oxidizer. Oxidizer line 55 is preferably used when a gas such as air is used as an oxidizer.

The oxidizer air is pressurized and then mixed with the aqueous medium in a mixing nozzle 60 and introduced into hydrothermal electrolytic reaction vessel 62. In another embodiment, for example, a line for supplying an oxidizer to the hydrothermal electrolytic reactor may be separately provided to directly introduce high-pressure air into reactor 62 via compressor.

Alternatively, a liquid such as water in which oxygen gas is dissolved may be introduced into hydrothermal electrolytic reaction vessel 62. Oxidizers in the form of a gas such as oxygen gas (including air) have higher water-solubility at lower temperature or higher pressure. Therefore, an oxidizer in the form of a gas may be dissolved in water at low or room temperature under high pressure and then this cold water may be supplied to the reaction vessel. Alternatively, aqueous hydrogen peroxide, a hypochlorous acid or a solid oxidizer may be dissolved in water and supplied to the reaction vessel via a high-pressure pump or the like.

Hydrothermal electrolytic reaction vessel 62 has a reactor capable of resisting the pressure of hydrothermal reaction and an electrode 63 for electrolysis is provided in the reactor. The body of reactor 62 may have a metal inner wall serving as a cathode. For example, the reactor inner wall can be used as a cathode by connecting the anode of electric source 69 to the body via line 71, as shown in FIG. 1. In this case, the reactor body inner wall can be protected against corrosion. If a cathode is provided separately from the reactor body, the reactor body inner wall is susceptible to corrosion by a halide ion such as chloride ion at high temperature and high pressure of hydrothermal reaction.

Hydrothermal electrolytic reactor 62 can be made from nickel-based alloys such as Hastelloy, Inconel, Incoloy; titanium-based alloys; steels such as carbon steel, stainless steel. However, the reactor body inner wall may be covered with a coating layer of a metal such as platinum serving as a cathode.

An anode 63 is also provided in the body of hydrothermal electrolytic reactor 62. The shape of the anode is not limited in principle.

In the present invention, the distance between the anode and the cathode is preferably equal. If this distance varies, an excessive current flows locally at narrow regions to accelerate deterioration of the anode at those regions. In the present invention, the inner wall of reactor body 62 preferably has a cylindrical shape. Preferably, the outer face of anode 63 also has a cylindrical shape so that the center axis of anode 63 substantially coincides with the center axis of the reactor body inner wall.

Anode 63 may be a cylindrically shaped mesh or net or a cylindrically shaped plate.

Positive and negative terminals of dc source 69 are connected to anode 63 and cathode (reactor inner wall) via lines 70, 71, respectively. Line 70 for feeding the anode passes through reactor 62, while line 70 is insulated from reactor 62 by insulating member 72. When the reactor body is made from a metal, line 71 may be connected to the reactor body. The dc source may be derived from an ac current converted into a dc current using a full wave rectifier comprising a diode, condenser, resistor, etc.

Hydrothermal electrolytic reactor 62 is heated by heater 65. The heater may be an electric heater, for example. It may also be a bath of silicone oil or the like. If the reactor is in the form of a column, the reactor may be externally heated with a burner or the like.

The hydrothermal electrolytic reactor preferably has a thermocouple 68 for measuring the temperature of aqueous medium 61. The thermocouple may consist of, for example, a Chromel-alumel alloy or a platinum alloy. A temperature control mechanism may be provided for controlling heater 65 on the basis of the reading of thermocouple 68.

In said hydrothermal electrolytic reactor 62, an aqueous medium (and preferably an oxidizer) is supplied under heating and current application to degrade undegraded reducing substances in the aqueous medium.

In the hydrothermal electrolytic reactor of the present invention, the current density at the anode is preferably 0.1 mA/dm$^2$–500 A/dm$^2$. If the current density is higher than 500 A/dm$^2$, the surface of the anode is liable to be exfoliated or dissolved. If the current density is lower than 0.1 mA/dm$^2$, however, the area of the anode must be increased and the system becomes bulky. The current density is more preferably 10 mA/dm$^2$–100 A/dm$^2$, most preferably 100 mA/dm$^2$–50 A/dm$^2$. If a new material for the anode is developed, the current density at the anode can be further higher.

After a direct current is supplied for a period, scale may be formed on the surface of the cathode, ie, the inner wall of the hydrothermal electrolytic reactor body. Scale seems to result from deposition of a salt such as calcium carbonate. As scale grows, the resistance increases. When a constant direct current is supplied, for example, the voltage increases. Thus, it is preferable to reverse the anode and the cathode to supply a direct current when a certain resistance is reached. The inner wall of the hydrothermal electrolytic reactor body turns to serve as an anode to generate hydrogen ion, which locally forms an acidic environment. Calcium carbonate releases a weak acid, carbonic acid ($H_2CO_3$), to dissolve in the presence of a strong acid. Thus, scale of calcium carbonate or the like can be dissolved.

$$CaCo_3 + H^+ \text{(strong acid)} \rightarrow Ca^{2+} + HCO_3^- \quad (16)$$

In the embodiment wherein the electrodes are reversed, a corrosion-resistant material is preferably used for the hydrothermal electrolytic reactor.

To hydrothermal electrolytic reactor 62 is connected an effluent line 73 for discharging the effluent aqueous medium hydrothermally electrolyzed. Effluent line 73 preferably has heat exchangers 73 and 38, a gas-liquid separator 78, and an effluent tank 86, and the effluent hydrothermally electrolyzed in hydrothermal electrolytic reactor 62 can be transferred in this order. The oxidizer is heated by the heat of the effluent in heat exchanger 74, while the aqueous medium is heated by the heat of the effluent in heat exchanger 38.

Preferably, gas-liquid separator 78 is connected to an end of the effluent line. Gas-liquid separator 78 separates gas and liquid in the effluent. The effluent is held at a predetermined level in gas-liquid separator 78. A pressure transmitter tube may be provided between the space above said level and the effluent below said level, and a level detector 79 for determining the gas-liquid interface or slurry level may be provided in this pressure transmitter tube. Level detecting mechanism 79 may be designed to measure the level by the pressure difference between gas and liquid to discharge the effluent in such a manner that said level may be fixed or within a fixed range. Gas-liquid separator 78 may be provided with a piezoelectric element for converting pressure into an electric signal each above and below said level, whereby this electric signal is entered into a level detector to detect the pressure difference.

A valve 80 is connected to gas-liquid separator 78 so that the effluent in gas-liquid separator 78 can be discharged into container 86 when said valve is opened. Preferably, switching of valve 80 is controlled by a signal from level-controlling mechanism 79.

Gas-liquid separator 78 may have a pressure controlling mechanism for controlling the pressure in the gas-liquid separator within a predetermined range. Such pressure controlling mechanism may have, for example, a pressure detector for detecting the pressure of the gas phase, a valve for discharging gas and a controller for controlling the valve by a signal from the pressure detector. The pressure-controlling mechanism controls the pressure in the range that allows the influent to be kept in the liquid phase and hydrothermal electrolytic reactor 62 and gas-liquid separator 78 to be safely operated, for example. The pressure detector may have a piezoelectric element.

A valve 81 is connected to gas-liquid separator 78 so that the gas in gas-liquid separator 78 can be discharged to the atmosphere when valve 81 is opened. Preferably, switching of valve 81 is controlled by a signal from a pressure-controlling mechanism not shown.

Reducing substances that can be degraded by the process for treating an aqueous medium according to the present invention may be compounds that are oxidized with a OX$^-$ ion where X represents a chlorine atom, bromine atom or iodine atom of any combination thereof. Alternatively, reducing substances may be compounds that are oxidized with an oxidizer such as oxygen gas in the presence of water at a temperature of 100° C. or more but not more than the critical temperature of the aqueous medium. Reducing substances may be organic or inorganic.

Organics that can be degraded by the present invention include aliphatic and aromatic hydrocarbons such as alkanes, alkenes, alkynes; alcohols; aldehydes; ketones; amines; carboxylic acids such as acetic acid; carboxylic acid derivatives such as esters, amides, anhydrides; halogenated hydrocarbons; phenols; sulfur-containing organic compounds such as sulfoxides, mercaptans, thiols, polysulfones; etc.

Both aliphatic and aromatic hydrocarbons are oxidatively degraded. Aliphatic hydrocarbons that can be degraded are not limited to lower alkanes such as methane and ethane or lower alkylenes such as ethylene, but also include polymers such as polyethylene and polypropylene.

Aromatic hydrocarbons that can be degraded include benzene, naphthalene, azulene, anthracene, pyrene. Synthetic polymers such as polyphenylene oxide and polyarylate can also be degraded.

Nitrogen-containing heterocycles such as pyrrole, pyridine, indole, benzimidazole; oxygen-containing heterocycles such as furan, tetrahydrofuran, benzopyran; sulfur-containing heterocycles such as thiophene can also be degraded. Synthetic polymers containing such a heterocycle in the monomer unit such as phenol resins can also be degraded.

Degradable alcohols are not limited to lower alcohols such as methanol, ethanol, but also include polyvinyl alcohol. Monosaccharides such as glucose or fructose, disaccharides, oligosaccharides and polysaccharides such as cellulose are also included.

Amines can be typically degraded into nitrogen gas and water via ammonia. Degradable amines include, for example, aliphatic amines such as alkylamines and aromatic amines such as aniline.

Synthetic polymers having a nitrogen atom such as urea resins, melamine resins and polyurethane resins can also be degraded.

Compounds having two or more functional groups can also be degraded. For example, compounds having a hydroxyl group and an amino group such as ethanolamine can be degraded. Compounds having a carboxyl group (—COOH) and an amino group such as amino acids can also be degraded. Hydrolyzable compounds such as proteins, polysaccharides and polyesters can also be degraded. Such polyesters include, for example, nylon, polyarylate, unsaturated polyester resins, etc.

Halogenated hydrocarbons are typically degraded into a hydrogen halide such as hydrogen chloride, carbon dioxide and water. Preferably, a base is preliminarily added to the aqueous medium to neutralize the resulting hydrogen halide. Suitable bases are not specifically limited, but sodium hydroxide, potassium hydroxide or the like can be preferably used. Those halogenated hydrocarbons include, for example, aliphatic compounds having a halogen atom such as trihalomethane (eg, chloroform), trichlorofluoromethane, tetrachloromethane, dichloromethane, dichloroethane; and aromatic compounds having a halogen atom such as chlorophenol, polychlorobiphenyl (PCB), dioxin.

Said organic compounds substituted by a functional group containing a silicon atom such as trimethylsilyl are also oxidatively degraded.

Sulfur-containing compounds such as phosphate derivatives can also be degraded. An example of phosphate derivatives is malathion represented by chemical formula $(CH_3O)_2P(=S)—S—CH(CO_2C_2H_5)(CH_2CO_2C_2H_5)$. Malathion is a cholinesterase inhibitor, and other cholinesterase inhibitors that can also be degraded by the present invention are shown below.

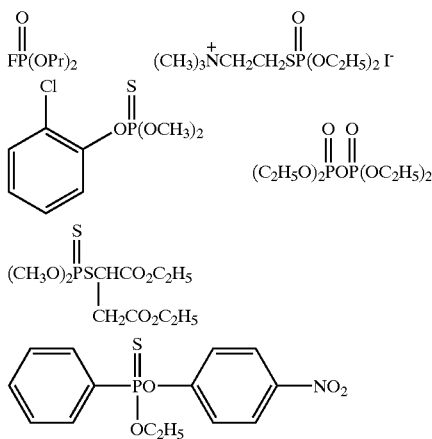

Phospholipids can also be degraded.

Inorganics that can be degraded by the present invention include, for example, ammonia; nitrate ion and nitrite ion; cyanogen compounds such as sodium cyanide; and inorganic nitrogen sources such as urea. Ammonia is degraded into nitrogen gas via nitrate ion. Nitrate ion and nitrite ion are degraded by anodic reaction at high temperatures. Cyanide ion ($CN^-$) is hydrolyzed to produce formic acid and an ammonium salt. Formic acid and ammonium ion can be further degraded into carbon dioxide, nitrogen gas and water. It is sometimes preferred that a base such as sodium hydroxide or potassium hydroxide is added to degrade cyanogen compounds. Sulfur compounds such as hydrogen sulfide are also oxidized.

Nitrogen sources such as ammonia, nitrate ion, nitrite ion and amines are under emission control because they invite eutrophication. They should be reduced below regulatory standards.

According to the present invention, "aqueous media" are electrolyzed. The "aqueous media" may be any of suspensions, emulsions and aqueous solutions. Aqueous media may contain liquid or solid reducing substances. Therefore, "aqueous media" include suspensions of unprecipitable solid particles dispersed in water, emulsions of liquid particles dispersed in water, aqueous solutions of liquid organics or inorganics dissolved in water and mixtures thereof. "Aqueous media" contain a continuous phase containing water, liquid organics and dissolved salts and a discontinuous phase containing combustible particles such as tar or pitch, and optionally non-combustible solids such as ash.

In the present invention, a strong acid ion can be used in place of or in combination with the halide ion incorporated into the aqueous medium.

The strong acid ion used for this purpose is preferably an ion corresponding to a strong acid having a dissociation constant (pK) of 3.5 or less at 25° C., more preferably an ion corresponding to a strong acid having a dissociation constant of 2.5 or less at 25° C. The acid corresponding to the strong acid ion is preferably protic.

The strong acid ion may be an inorganic acid ion or an organic acid ion. However, the strong acid is preferably an inorganic acid ion because organic acid ions may be degraded as hydrothermal electrolysis proceeds.

Suitable inorganic strong acid ions include, for example, halide ions, sulfate ion ($SO_4^{2-}$), nitrate ion ($NO_3^-$), phosphate ion ($PO_4^{3-}$). Suitable organic strong acid ions include, for example, trifluoroacetate ion ($CF_3COO^-$).

The strong acid ion may exist as an acid or a salt. When it exists as a salt, the salt may be formed with an inorganic cation such as an alkali metal ion or alkali earth metal ion or an organic cation.

Figure 2:
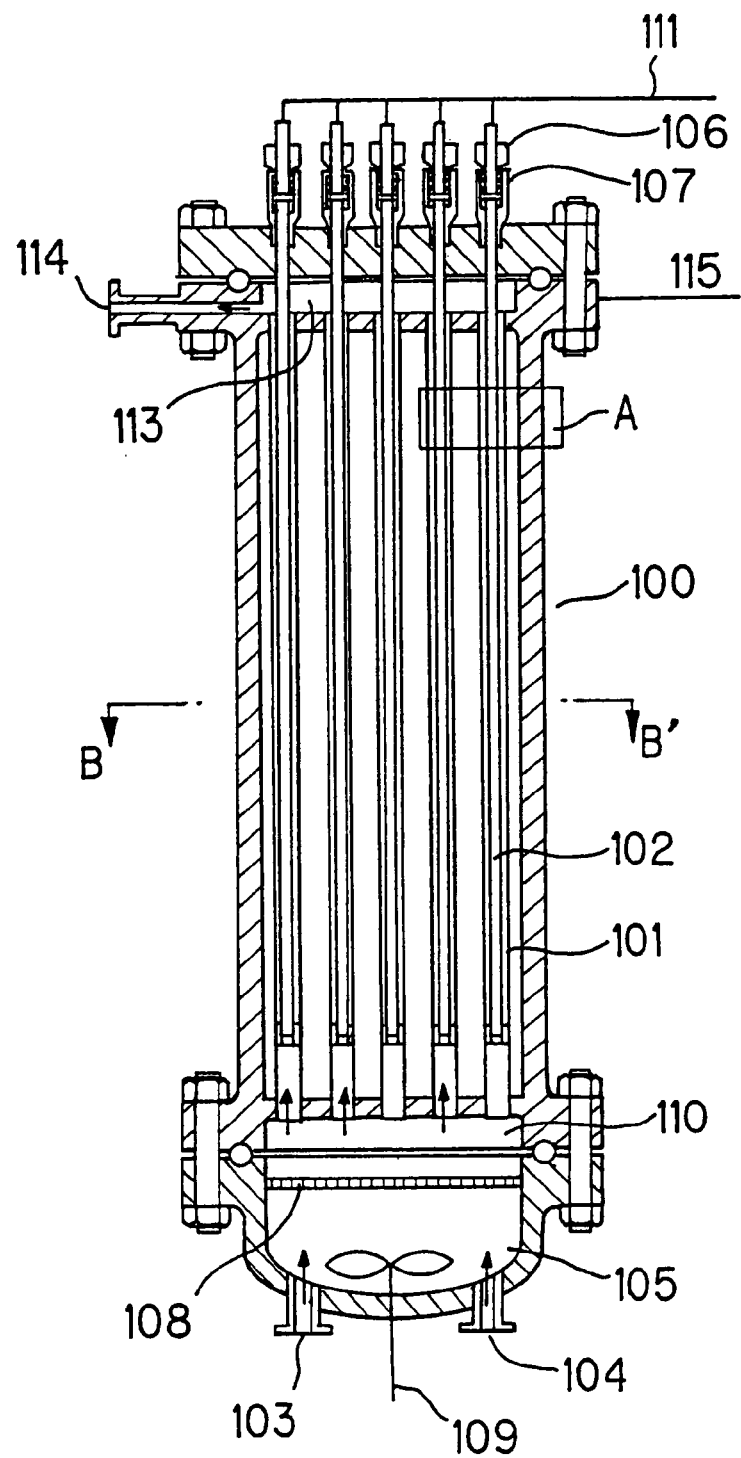
FIG. 2 shows the inner structure of one embodiment of a hydrothermal electrolytic reactor that can be used in the first aspect of the present invention.
Figure 3:
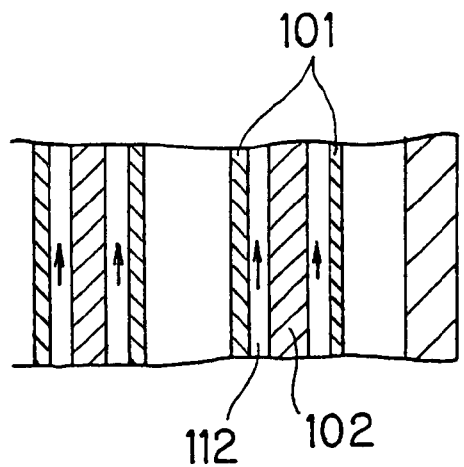
FIG. 3 is a partial enlarged view of the reactor shown in FIG. 2.
Figure 4:
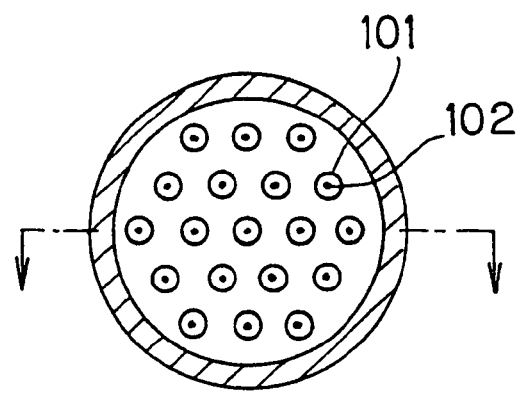
FIG. 4 is a cross-sectional view of the reactor shown in FIG. 2.

The hydrothermal electrolytic reactor used in the first aspect of the present invention may be of a multitube structure as shown in FIGS. 2–4 in place of hydrothermal electrolytic reactor 62 of a single tube structure as shown in FIG. 1. Hydrothermal electrolytic reactor 100 of multitube structure shown in FIG. 2 has two or more tubular reaction cells 101. Each of the reaction cells has a metal inner wall serving as a cathode, and a discharge electrode 102 serving as an anode is provided in each of the reaction cells. FIG. 3 is an enlarged view of A in FIG. 1, and FIG. 4 is a cross-sectional view taken along B–B' line in FIG. 2.

Hydrothermal electrolytic reactor 100 according to the second embodiment of the present invention shown in FIGS. 2–4 comprises a lower vessel part, a middle vessel part and an upper vessel part. The lower vessel part comprises an inlet 103 for introducing influent, an oxidizer inlet 104 for introducing an oxidizer, and a mixing chamber 105 for mixing the influent introduced via the inlet and the oxidizer introduced via the oxidizer inlet. The influent and the oxidizer may be mixed in a mixer 60 in the form of a mixing nozzle and then introduced into the reactor, as shown in FIG. 1. The middle vessel part comprises a plurality of reaction cells 101 in which the influent mixed with an oxidizer is electrolyzed under pressure and heating.

The upper vessel part comprises a current feed terminal 106 corresponding to each reaction cell. The current feed terminal preferably has an insulating member 107 for insulating from the reactor. Each current feed terminal has a discharge electrode (anode) 102 extending to the lower end of reaction cell 101.

The lower vessel part, middle vessel part and upper vessel part are connected together via gaskets, which tightly seal the inside. Thus, the reactor as a whole forms a pressure-resistant vessel.

Each of influent inlet 103 and oxidizer inlet 104 is singly provided in the bottom wall of the lower vessel part. Influent inlet 103 is connected to an influent feed line and oxidizer inlet 104 is connected to an oxidizer line (corresponding to 43 and 55 of FIG. 1, respectively).

Mixing chamber 105 is partitioned by a dispersion plate 108 and contains a stirrer 109 therein. Dispersion plate 108 may be any known means for mixing influent by disturbing the flow. Stirrer 109 is a common type having stirring blades 25a and used to help mixing and connected to a motor not shown.

At the connection between the lower vessel part and the middle vessel part is provided an introduction chamber 110 for smoothly introducing the influent mixed with an oxidizer in the mixing chamber into the reaction cell. The wall of the middle vessel part is connected to a negative line 115, which is in turn connected to a negative terminal not shown of a dc source at constant current and voltage.

The tubular body forming hydrothermal electrolytic reaction cell 101 is electrically connected with the wall of the middle vessel part. For example, a stainless steel tube may be welded to a stainless steel middle vessel part. Thus, the entire inner face of the reaction cell serves as a cathode. The reaction cell may be integrally formed with the middle vessel part or separately formed and fitted or otherwise incorporated into it. Thus, the inner face of the reaction cell serves as a negative electrode to prevent electrolytic corrosion.

Discharge electrode 102 is in the form of a rod having a diameter smaller than the inner diameter of reaction cell 101 and arranged at a predetermined position in such a manner that each one may be inserted into each reaction cell. The discharge electrode may be a cylindrically shaped mesh or net or a cylinder having an axial hollow.

In the present invention, the distance between the anode and the cathode is preferably equal. If this distance varies, an excessive current flows locally at narrow regions to accelerate deterioration of the anode at those regions. In this embodiment, the inner wall of reaction cell 101 preferably has a cylindrical shape. Preferably, the outer peripheral face of discharge electrode 102 also has a cylindrical shape so that the center axis of the discharge electrode substantially coincides with the center axis of the inner wall of the reaction cell.

At an end of the discharge electrode is provided an insulating spacer not shown to prevent any contact with the inner face of the reaction cell. The insulating spacer is preferably formed to suit the shape of the outer surface of the discharge electrode and the shape of the inner face of the reaction cell. The insulating spacer preferably has a through hole that allows the influent to pass.

Current feed terminal 106 is connected to positive line 111, which is in turn connected to a positive terminal not shown of a constant dc source separately provided. Thus, the discharge electrode serves as an anode.

A chamber 112 is formed between the inner face of the reaction cell and the discharge electrode and connected to a discharge channel 113 formed at the connection between the middle vessel part and the upper vessel part. The discharge channel is connected to an outlet 114 at the upper end of the middle vessel part for discharging effluent from the reactor.

Each member can be formed from any material so far as the middle vessel part and the reaction cell should be formed from an electrically conductive material and the reaction vessel as a whole should be formed from a heat-resistant and pressure-resistant material. For example, the middle vessel part and the reaction cell can be formed from stainless steel. The reaction cell may have a multilayer structure comprising the innermost layer of an electrically conductive material such as stainless steel and the other layers of ceramics.

In this embodiment, a disperser not shown is provided in the reactor to homogenize the flow rate in the cross section of the reactor.

Such a hydrothermal electrolytic reactor of multitube structure can be used to increase the area of electrodes in the pressure vessel and therefore increase the electricity for hydrothermal electrolytic reaction.

Figure 5:
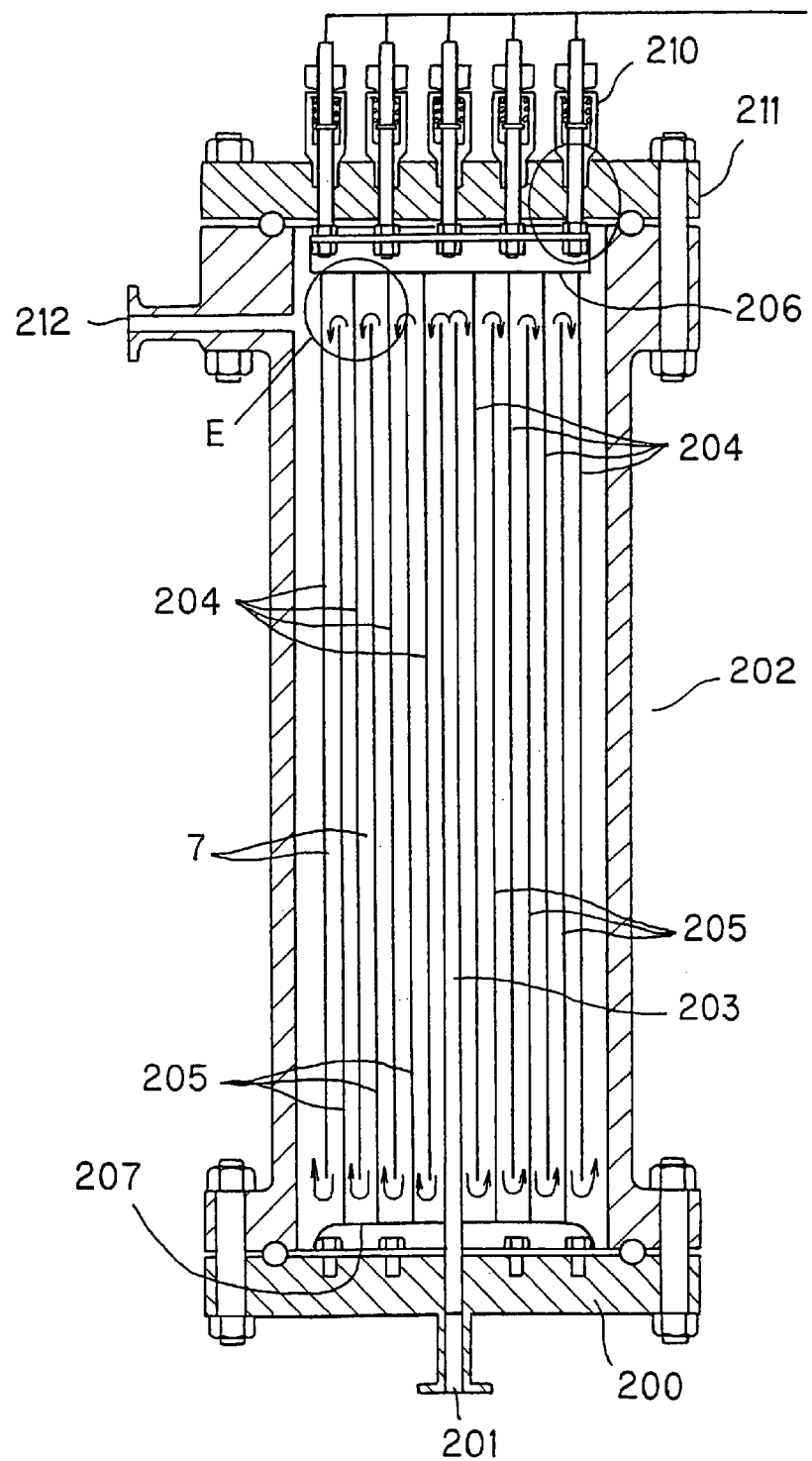
FIG. 5 shows the inner structure of another embodiment of a hydrothermal electrolytic reactor that can be used in the first aspect of the present invention.
Figure 6:
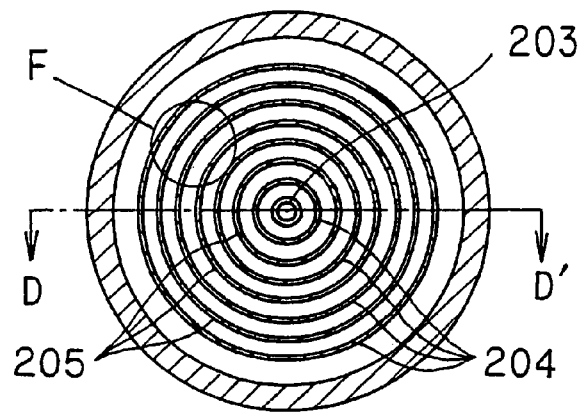
FIG. 6 is a cross-sectional view of the reactor shown in FIG. 5.
Figure 7:
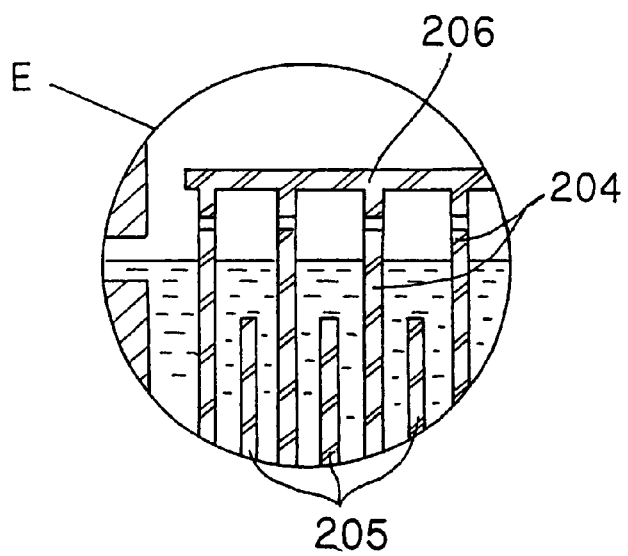
FIG. 7 is a partial enlarged sectional view of the reactor shown in FIG. 5.

According to still another embodiment of the present invention, a hydrothermal electrolytic reactor of the structure as shown in FIGS. 5–7 can be used. FIG. 5 is a sectional view showing the inner structure of a hydrothermal electrolytic reactor according to said still another embodiment of the present invention, and FIG. 6 is a widthwise sectional view showing the inner structure of the reactor shown in FIG. 5. FIG. 7 is an enlarged sectional view of E in FIG. 5.

In the hydrothermal electrolytic reactor shown in FIGS. 5–7, lower vessel part 200 has an influent inlet 201 at the center of the bottom and said inlet 201 is connected to a pipe 203 extending from lower vessel part 200 to the top of middle vessel part 202. Influent is preliminarily mixed with an oxidizer in a mixer not shown, if desired. Preferably, influent is preliminarily heated up to a temperature of 100° C. or more but not more than the critical temperature.

Middle vessel part 202 includes an anode 204 and a cathode 205. Anode 204 has two or more concentrically cylindrical side walls and a connecting member 206 for connecting the side walls together. In the same manner, cathode 205 has two or more concentrically cylindrical side walls and a connecting member 207 for connecting the side walls together. The side walls of anode 204 and cathode 205 are alternately arranged to form a channel for influent between the side walls of anode 204 and cathode 205.

Preferably, pipe 203 is electrically connected to connecting member 207 to serve as a cathode. Thus, pipe 203 and the reactor body can be protected against corrosion.

Both connecting members 206, 207 are in the form of a disk and electrically conductive. Connecting member 206 fixes anode 204 to current input terminals 210. Connecting member 207 fixes cathode 205 to lower vessel part 200.

Thus, the hydrothermal electrolytic reactor according to the embodiment shown in FIGS. 5–7 has a concentrically cylindrical continuous reaction channel. The reaction channel is continuously provided from the center to the outer periphery of the reaction vessel so that influent flows from the center to the outer periphery of the reaction vessel. Upper vessel part 211 includes a plurality of current feed terminals 210. Upper vessel part 211 and current feed terminals 210 are electrically insulated from each other via an insulator.

In the reactor of this embodiment, influent is introduced from inlet 201 and transferred to the top of the reaction vessel via pipe 203, then from the top to the bottom of the reaction vessel in the outer channel, then from the bottom to the top in the subsequent outer channel, and so on. Thus, it is transferred successively from the center to the periphery of the reaction vessel. During then, reducing substances in the influent are oxidatively degraded by hydrothermal electrolysis. The treated influent is discharged from outlet 212 to the outside of the reaction vessel.

In the hydrothermal electrolytic reactor according to this embodiment, the area of electrodes in the hydrothermal electrolytic reactor can be increased, which leads to an increased throughput and an improved homogeneous reaction, whereby a large amount of influent can be treated. Moreover, the reaction channel can be longer to improve the efficiency of electrolysis. Thus, even low-concentration influent can be effectively treated.

In addition to the process and apparatus for treating an aqueous medium according to the first aspect of the present invention as described above, the technical purpose of greatly reducing the electricity consumed in the hydrothermal electrolytic reactor can also be attained by subjecting an aqueous medium prior to hydrothermal electrolysis to a hydrothermal reaction at a temperature of 100° C. or more but not more than the critical temperature of said aqueous medium and at a pressure that allows said aqueous medium to be kept in the liquid phase.

Accordingly, a second aspect of the present invention relates to a process for treating an aqueous medium comprising the steps of:

subjecting an aqueous medium containing water and reducing substances to hydrothermal oxidation reaction at a temperature of 100° C. or more but more than the critical temperature of said aqueous medium and at a pressure that allows said aqueous medium to be kept in the liquid phase, and then subjecting said aqueous medium to hydrothermal electrolysis under application of a direct current at a temperature of 100° C. or more but not more than the critical temperature of said aqueous medium and at a pressure that allows said aqueous medium to be kept in the liquid phase.

The second aspect of the present invention also relates to an apparatus for treating an aqueous medium comprising:

a hydrothermal reaction part for maintaining an aqueous medium containing water and reducing substances at a temperature of 100° C. or more but not more than the critical temperature of said aqueous medium and at a pressure that allows said aqueous medium to be kept in the liquid phase, and a hydrothermal electrolysis part for supplying a direct current to said aqueous medium treated in said hydrothermal reaction part at a temperature of 100° C. or more but not more than the critical temperature of said aqueous medium and at a pressure that allows said aqueous medium to be kept in the liquid phase.

According to the second aspect of the present invention, readily degradable reducing substances can be degraded to save the electric power for hydrothermal electrolysis by performing hydrothermal reaction prior to hydrothermal electrolysis.

In the second aspect of the present invention, it is especially preferred that the first step of hydrothermal oxidation reaction, ie, hydrothermal reaction in the presence of an oxidizer precedes the second step of hydrothermal electrolysis. Thus, hydrothermal electrolysis can be performed after reducing substances degradable by oxidation reaction are degraded by hydrothermal oxidation reaction. Thus, the electric power for hydrothermal electrolysis can be further saved.

A process for treating an aqueous medium according to the second aspect of the present invention wherein hydrothermal electrolysis is preceded by a hydrothermal oxidation reaction is mainly described below. However, the second aspect of the present invention also includes an embodiment wherein hydrothermal electrolysis is preceded by a hydrothermal reaction in the absence of an oxidizer.

Preferred embodiments of the process for treating an aqueous medium according to the second aspect of the present invention are explained in detail below with reference to the attached drawings.

Figure 8:
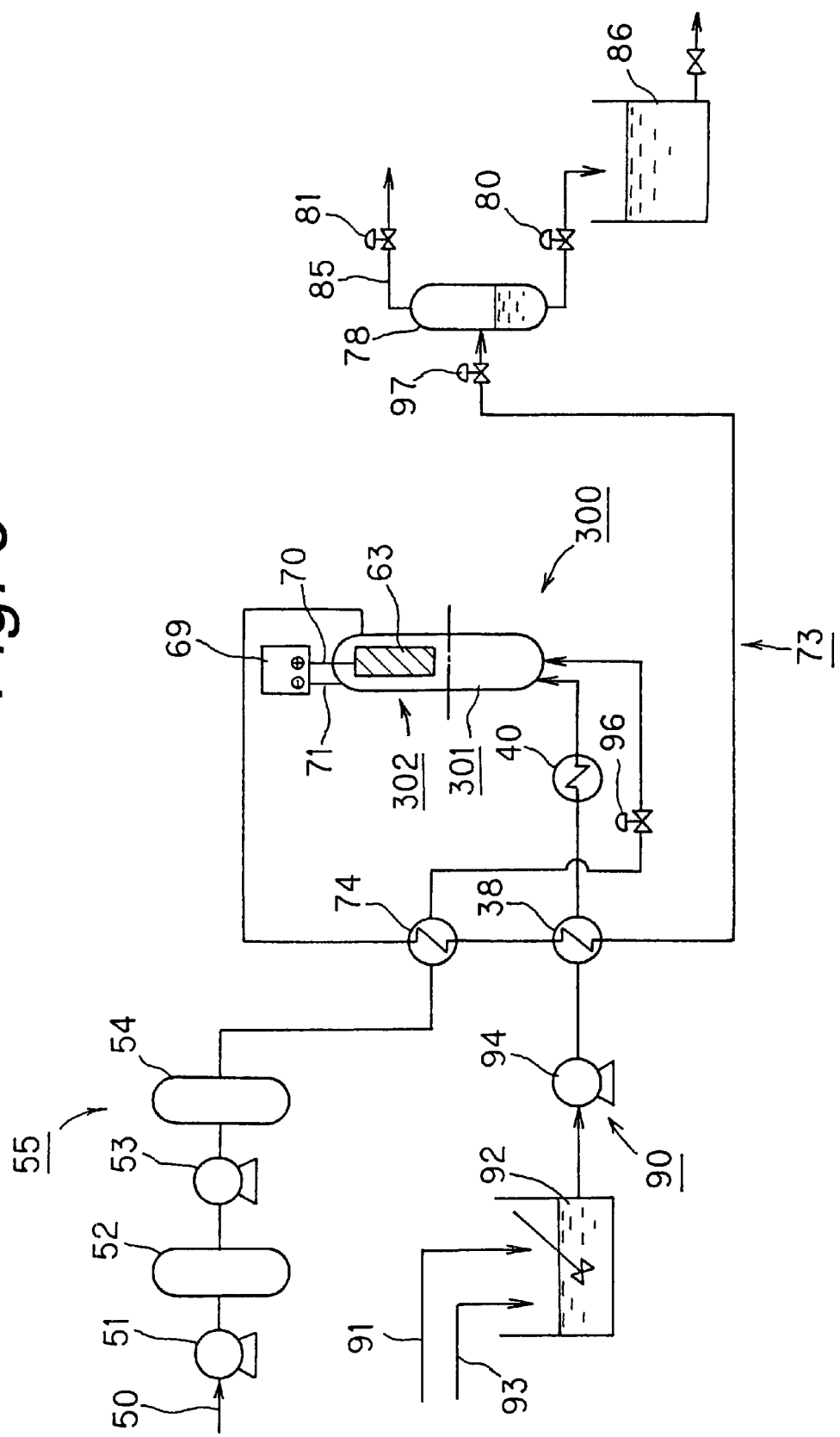
FIG. 8 is a schematic view showing the general structure of an aqueous medium treatment apparatus according to a second aspect of the present invention.

FIG. 8 is a schematic view showing the general structure of an embodiment of an apparatus for treating an aqueous medium according to the second aspect of the present invention. However, the structure of the oxidizer line, aqueous medium-conditioning tank, heater or the like and the material of each member in the hydrothermal electrolytic reactor can be selected in the same manner as described for the treatment apparatus shown in FIG. 1, and only differences from the treatment apparatus shown in FIG. 1 are specifically explained below. The explanation about the treatment apparatus shown in FIG. 1 is appropriately applied when no reference is made below. Similar elements to those in the treatment apparatus shown in FIG. 1 are designated by the same reference numbers as used in FIG. 1.

Aqueous medium reactor 300 according to the second aspect of the present invention comprises a hydrothermal reaction part 301 for maintaining an aqueous medium containing water, reducing substances and an oxidizer at a temperature of 100° C. or more but not more than the critical temperature of said aqueous medium and at a pressure that allows said aqueous medium to be kept in the liquid phase, and a hydrothermal electrolysis part 302 for supplying a direct current to said aqueous medium treated in said hydrothermal oxidation reaction part 301 at a temperature of 100° C. or more but not more than the critical temperature of said aqueous medium and at a pressure that allows said aqueous medium to be kept in the liquid phase.

More specifically, the treatment apparatus according to this embodiment further comprises an aqueous medium line 90 for supplying an aqueous medium to said hydrothermal oxidation reaction part 301, an oxidizer line 55 for supplying an oxidizer to said hydrothermal oxidation reaction part 301, and an effluent line 73 for discharging effluent from said hydrothermal electrolysis part 302.

Aqueous medium line 90 comprises a conditioning tank 92 in which an aqueous medium such as waste liquor is injected via aqueous medium injection line 91, an electrolyte injection line 93 for injecting an electrolyte ion such as a strong acid ion into conditioning tank 92, a high-pressure pump 94 for pressurizing the aqueous medium conditioned with the electrolyte to the reaction pressure, a heat exchanger 38 for heating said aqueous medium to the reaction temperature, and a heater 40. Heater 40 may have a similar structure to that of heating section III shown in FIG. 1.

The structure of oxidizer line 55 is as explained in FIG. 1.

An effluent line 73 for discharging the effluent treated in hydrothermal electrolysis part 302 is connected to reactor 300, and said effluent line 73 has a heat exchanger 74 and a heat exchanger 38 for cooling the treated aqueous medium discharged, a reducing valve 97 for further depressurizing said aqueous medium, a gas-liquid separator 78 for separating gaseous components such as nitrogen, carbon dioxide gas, a valve 81 for releasing gaseous components to the atmosphere via gas discharging line 85, and a valve 80 for releasing liquid to an effluent tank.

In this embodiment, reactor 300 has hydrothermal oxidation reaction part 301 and hydrothermal electrolysis part 302. That is, hydrothermal oxidation reaction part 301 and hydrothermal electrolysis part 302 are provided in the same reactor 300. Hydrothermal oxidation reaction part 301 forming a hydrothermal oxidation section and hydrothermal electrolysis part 302 forming a hydrothermal electrolysis section are provided without any special physical boundary.

An anode 63 is provided in an upper part of a chamber defined by reactor 300. However, anode 63 does not extend to the bottom of the chamber in reactor 300.

Positive and negative terminals of dc source 69 are connected to anode 63 and cathode (reactor inner wall) via lines 70, 71, respectively. Line 70 for feeding anode 63 is passes through reactor 300 while line 70 is insulated from reactor 300 by an insulating member. When the reactor body is made from a metal, line 71 may be connected to the reactor body. The dc source may be derived from an ac current converted into a dc current using a full wave rectifier comprising a diode, condenser, resistor, etc.

Next, a process for treating an aqueous medium according to the second aspect of the present invention as shown in FIG. 8 is explained.

In order to perform the process for treating an aqueous medium according to the second aspect of the present invention, an aqueous medium is introduced into reactor 300. Specifically, an aqueous medium containing various reducing substances (pollutants) is injected into conditioning tank 92 via aqueous medium injection line 91.

If the amount of a halide ion or other electrolyte ions serving as a catalyst in hydrothermal electrolysis in this conditioning tank 92 is insufficient, an electrolyte is injected via electrode injection line 93 while monitoring the electric conductivity or halide ion level in conditioning tank 92.

If the amount of a halide ion or other electrolyte ions serving as a catalyst in the aqueous medium in hydrothermal electrolysis is too small, oxidative degradation reaction does not smoothly proceed so that a large current or a long treatment period is needed to attain high degradation and a high voltage is needed to apply a predetermined current for hydrothermal electrolysis. This hydrothermal electrolytic reaction itself is not specifically directly influenced by voltage. The reaction is influenced by electricity (expressed as coulomb, 1 coulomb=1A×1 second), ie, the integral of current and application period. However, power consumption (expressed as kWh) is directly influenced by load voltage, and power consumption increases with voltage to raise the running costs of the hydrothermal electrolytic process. Said aqueous medium preferably contains an electrolyte at a concentration of 0.5 mmol/l or more to reduce this power consumption.

The aqueous medium conditioned with an electrolyte is pressurized to the reaction pressure (a pressure that allows said aqueous medium to be kept in the liquid phase) by high-pressure pump 94, and heated up to the reaction temperature (100° C. or more but not more than said critical temperature) by heat exchanger 38 and heater 40.

Air is used as an oxidizer in this embodiment, though liquid oxidizers such as hypohalous acids, dissolved ozone or hydrogen peroxide may also be used, and in the latter case, a high-pressure pump for pressurizing liquid or other means may be incorporated. The oxidizer air is introduced from oxidizer injection line 50 into reactor 300 via oxidizer line 55. The structure of oxidizer line 55 is the same as described above for the embodiment shown in FIG. 1.

The oxidizer pressurized to the reaction pressure or more is preheated in heat exchanger 74 and an appropriate amount of the oxidizer is injected into reactor 300 via valve 96. As shown in FIG. 8, an influent aqueous medium and an oxidizer can be separately introduced into reactor 300. As shown in FIG. 8, they may be introduced into the reactor via completely separate lines. In this case, a disperser may be provided at the bottom of reactor 300. Alternatively, a mixing nozzle such as a coaxial double tube may be used to facilitate agitation/mixing of the influent aqueous medium and the oxidizer.

The heated and pressurized aqueous medium and the heated and pressurized oxidizer are injected into hydrothermal oxidation reaction part 301 of the reactor where the hydrothermal oxidation reaction step as described above takes place.

During this hydrothermal oxidation reaction step, various readily degradable substances contained in the aqueous medium are exclusively degraded by the oxidative effect of molecular oxygen (dissolved oxygen). Substances having intermediate properties between persistent substances and readily degradable substances are partially oxidized or partially degraded. However, only readily degradable substances such as formic acid and oxalic acid (and all other substances susceptible to oxidation reaction by oxygen) are treated here at high degradation efficiency as described above. In order to completely degrade readily degradable substances here, a relatively long retention time is required.

The reaction temperature and reaction pressure are as described above. The reaction temperature is preferably 180–350° C. The reaction pressure is preferably 10–200 atm. If the reaction temperature is less than 100° C., hydrothermal reaction is retarded. At supercritical temperatures, however, the solubility of the electrolyte decreases.

The retention time (reaction time) of the aqueous medium in hydrothermal oxidation reaction part 301 is preferably in the range of 3 hours to 1 minute. If it exceeds 3 hours, the volume of hydrothermal oxidation reaction part 301 excessively increases though it is preferably smaller because it is a pressure vessel. If the retention time is less than 1 minute, however, degradation reaction insufficiently proceeds for the lack of enough time for contact between reducing substances and an oxidizer because it is an oxidative degradation reaction with low-activity molecular oxygen. When the aqueous medium is nearly free from readily degradable substances or partially oxidizable substances, however, the retention time may be 1 minute or less. The retention time here should be changed depending on the nature of reducing substances contained in the aqueous medium. This retention time is preferably determined on the basis of a separate batch hydrothermal oxidation test or the like.

The retention time may not be enough to completely degrade readily degradable substances. Both readily degradable substances and persistent substances can be degraded by hydrothermal electrolysis in hydrothermal electrolysis part 302. However, if a lot of readily degradable substances are left for the hydrothermal electrolysis step, electrochemically internally produced expensive oxidizers (active oxygen, nascent oxidizers) are liberally consumed to raise the running costs of the overall aqueous medium treatment process. Ideally, 30% or more, more ideally 50% or more of readily degradable substances are degraded during the hydrothermal oxidation step. Intermediate substances are also preferably treated in an amount of 30% or more of partially oxidizable or partially degradable fractions.

This oxidation reaction with molecular oxygen is an exothermic reaction so that the reaction temperature can be kept by autogenous combustion and the reaction solution at further higher temperature can be sent to the hydrothermal electrolysis step when the aqueous medium contains a sufficient amount of reducing substances. If the reaction temperature is too low during the hydrothermal electrolysis step, the amount of hydrogen generated by the anodic reaction increases to invite the danger of forming an explosive mixed gas. Therefore, the temperature of the reaction solution to be sent to the hydrothermal electrolysis step is preferably 100–374° C. If the temperature is higher than 374° C., the electrolyte is insoluble in water because the critical temperature of water is exceeded. In this state, little current flows across electrodes. Thus, a high voltage is required to apply a given current, whereby power consumption for hydrothermal electrolysis increases. Therefore, the hydrothermal electrolysis step is preferably kept at a subcritical temperature (below 374° C.).

The hydrothermal electrolysis itself here is also an exothermic reaction so that the reaction solution sent from the hydrothermal oxidation step to the hydrothermal electrolysis step is preferably controlled at a temperature taking into account this exothermic heat. When the amount of reducing substances contained in the aqueous medium is absolutely small, hydrothermal oxidation reaction part 11 and hydrothermal electrolysis part 12 may be externally heated.

In reactor 300, the hydrothermal oxidation step of an aqueous medium takes place in hydrothermal oxidation reaction part 301, and then the hydrothermal electrolysis step takes place in hydrothermal electrolysis part 302. During the hydrothermal electrolysis step, persistent substances, partially oxidized substances and the remaining readily degradable substances are exclusively degraded.

The reaction temperature and reaction pressure are as described above. The reaction temperature is preferably 180–350° C. The reaction pressure is preferably 10–200 atm. If the reaction temperature is less than 100° C., hydrothermal reaction is retarded.

In hydrothermal electrolysis part 302 having the structure as described above, molecular oxygen or the like is converted into active oxygen or the like at the cathode while a nascent oxidizer is produced and reducing substances in the aqueous medium are efficiently degraded at the anode. The degradation rate here depends on the dc supply (electricity). Oxidizers electrochemically generated at high temperature and high pressure are very active and are rapidly consumed. Therefore, a high current may be applied when the retention time of the reaction solution at hydrothermal electrolysis part 302 is to be shortened. If the retention time is shortened, hydrothermal electrolysis part 302 can be reduced. However, excessive reduction means a small capacity for receiving electrodes, which necessitates reduction of the electrode area. When a high current is applied to a small electrode area, dissolution of electrode materials or other problems arise.

During the hydrothermal electrolysis step, the influent aqueous medium preferably further contains a strong acid ion such as a halide ion as described above. Thus, an electrolyte is incorporated into the aqueous medium in this embodiment.

After completion of the hydrothermal electrolysis step, the high-temperature effluent hydrothermally electrolyzed at hydrothermal electrolysis part 302 is cooled in heat exchanger 74 and heat exchanger 38 via effluent line 73, and then depressurized below the reaction pressure via reducing valve 97. After having passed through the reducing valve, gaseous components such as nitrogen and carbon dioxide gas are separated in gas-liquid separator 78 and discharged to the atmosphere from valve 81 via gas discharge line 85. The liquid effluent is transiently stored in effluent tank 86 from the bottom of the gas-liquid separator via valve 80. After checking the water quality well below effluent standards at effluent tank 86, the final effluent is discharged into sewer, river or the like.

The process for treating an aqueous medium according to the second aspect of the present invention as described above can also be used to effectively perform hydrothermal electrolysis, thus saving electric costs and reducing the running costs in the same manner as in the first aspect.

We attributed these effects to the following reasons.

In a hydrothermal atmosphere, molecular oxygen is dissolved in water at high temperature and high pressure. This dissolved molecular oxygen becomes abundant in the liquid phase as pressure increases.

However, some substances can be degraded but others cannot be degraded with this molecular oxygen as also shown in the conventional hydrothermal oxidation (the process known as wet oxidation or Zimmerman process). For example, ammonia, acetic acid or the like can be classified as persistent substances that are scarcely degraded with dissolved oxygen under this hydrothermal atmosphere. However, formic acid, oxalic acid or the like can be classified as readily degradable substances that are readily degraded to 99% or more with molecular oxygen under hydrothermal atmosphere.

The reason why these substances have varying stabilities against dissolved molecular oxygen under hydrothermal atmosphere has not been explained well.

Aqueous media or the like also contain substances that cannot be definitely classified into persistent substances or readily degradable substances. These substances have a functional group or a chemical bond, which is liable to be partially oxidized or degraded with a low-activity oxidizer such as dissolved oxygen. Typical examples thereof are biopolymers contained in various types of sludge, various synthetic polymers, humic acid, lignin, cellulose and substances having an amine group.

In these substances having intermediate properties between persistent substances and readily degradable substances, only the functional group or chemical bond liable to be oxidized or degraded often reacts with dissolved oxygen into less oxidizable substances. With hydrothermal electrolysis, these persistent substances and readily degradable substances can be both efficiently degraded by the action of a nascent oxidizer or active oxygen.

However, this electrochemically generated oxidizer involves higher production costs than molecular oxygen externally added by a compressor or the like, as described above. Thus, it is important to assign proper roles to these oxidizers in the practical aqueous medium treatment process. That is, it is advantageous that readily degradable substances are degraded with inexpensive external oxidizers such as molecular oxygen and that those resistant to these inexpensive oxidizers or persistent substances are degraded with electrochemically produced nascent oxidizers or active oxygen. It is also advantageous that substances having intermediate properties between persistent substances and readily degradable substances are partially oxidized or degraded with inexpensive external oxidizers and subjected to finishing advanced oxidative degradation with electrochemically produced active oxygen or nascent oxidizers.

Figure 9:
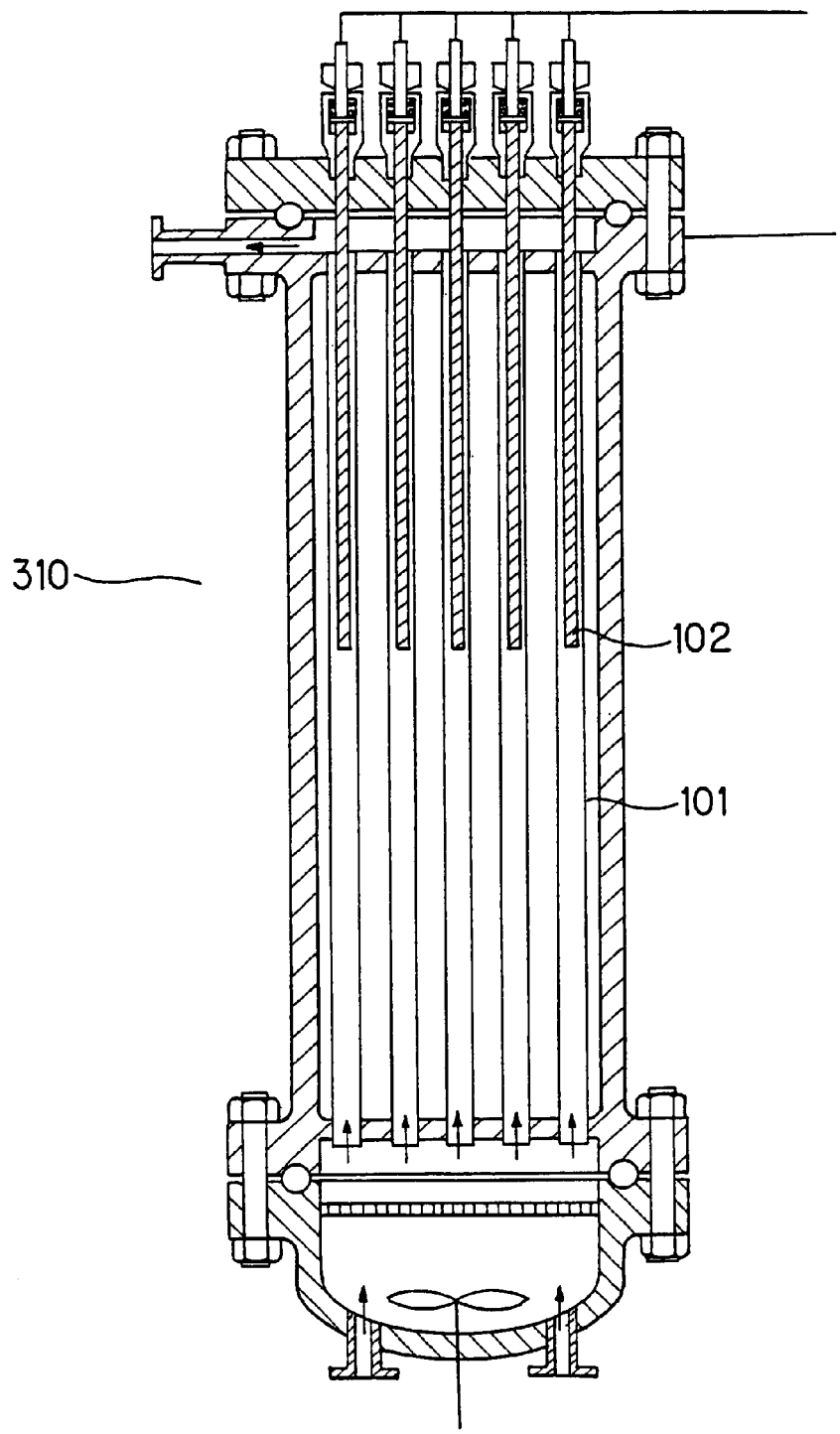
FIG. 9 shows the inner structure of one embodiment of a hydrothermal reactor/hydrothermal electrolytic reactor that can be used in the second aspect of the present invention.

Reactor 300 used in the second aspect of the present invention is preferably reactor 310 having the structure shown in FIG. 9. Reactor 310 shown in FIG. 9 differs from reactor 100 shown in FIG. 2 only in that discharge electrode 102 in each reaction cell 101 does not extend to the lower end of reaction cell 101 but terminates near the center of reaction cell 101. Other elements have the same structure as described in FIG. 2. At reaction part 310 shown in FIG. 9, the lower part of each reaction cell 101 containing no electrode serves as hydrothermal oxidation reaction part 301 and the upper part of each reaction cell 101 containing an electrode serves as hydrothermal electrolysis part 302.

Figure 10:
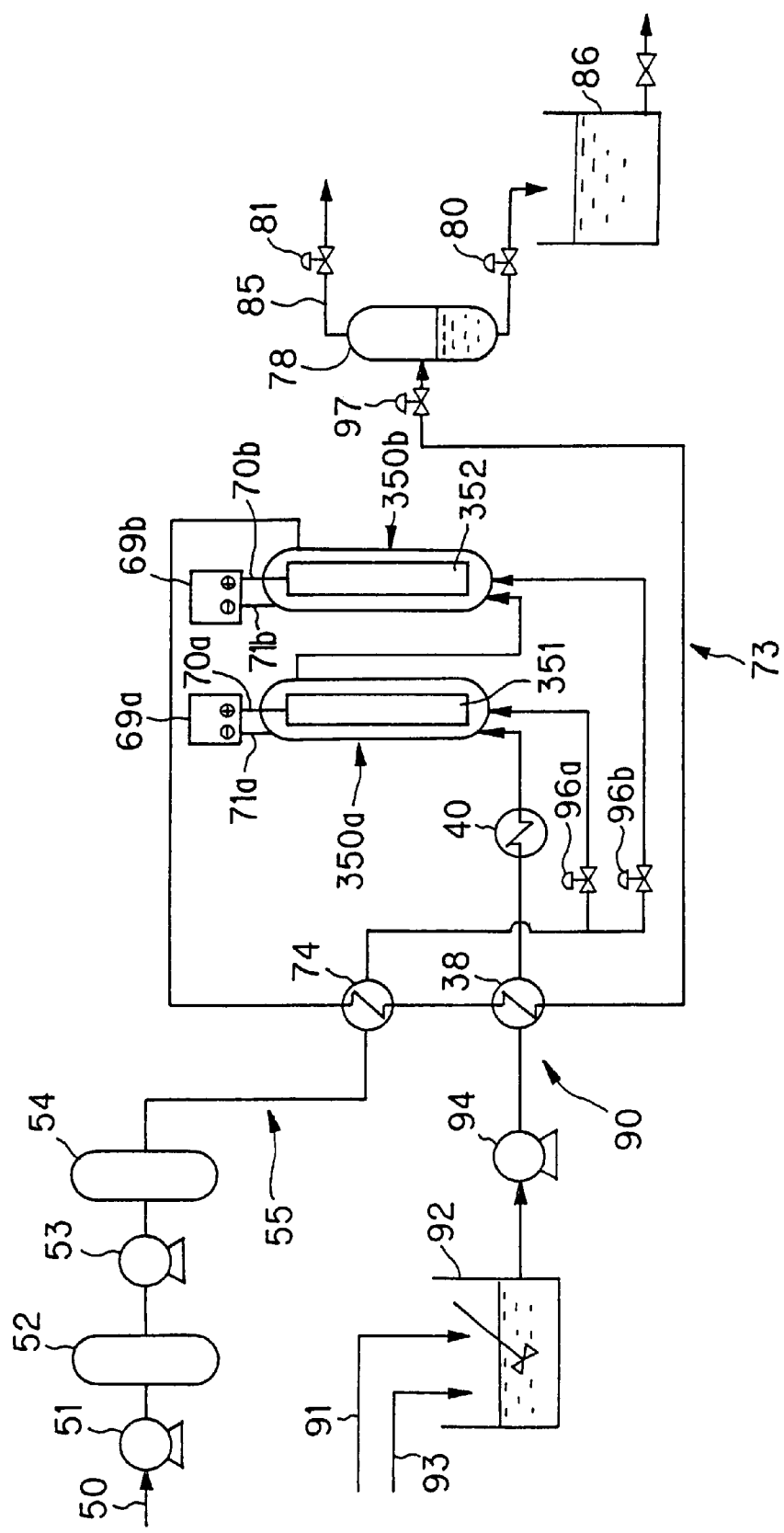
FIG. 10 is a schematic view showing the general structure of another embodiment of an aqueous medium treatment apparatus according to the second aspect of the present invention.

The second aspect of the present invention can also be embodied by a reactor having the structure as shown in FIG. 10. FIG. 10 is a schematic view showing another possible embodiment of the treatment apparatus according to the second aspect of the present invention.

In the following, differences from the reactor shown in FIG. 8 described above are especially described in detail below. The foregoing explanation is appropriately applied when no special reference is made.

The treatment apparatus according to the embodiment shown in FIG. 10 is characterized in that the reactor comprises a hydrothermal oxidation reactor 350a mainly serving for hydrothermal oxidation reaction and a hydrothermal electrolytic reactor 350b mainly serving for hydrothermal electrolysis. Namely, the hydrothermal oxidation reaction part and hydrothermal electrolysis part are provided in separate reactors.

Correspondingly, an oxidizer pressurized to the reaction pressure or more is preheated in heat exchanger 74, and then an appropriate amount of the oxidizer is injected into reactors 350a, 350b via valves 96a and 96b.

The inner structure of hydrothermal oxidation reactor 350a is the same as those of conventional hydrothermal oxidation reactors. Preferably, hydrothermal oxidation reactor 350a contains anode 351 therein for electric corrosion protection.

In reactor 350a, readily degradable substances contained in the aqueous medium are positively degraded by the oxidative effect of molecular oxygen (dissolved oxygen). Here are exclusively degraded readily degradable substances such as formic acid or oxalic acid (and any other substances liable to be oxidized with molecular oxygen). However, reactor 350a is preferably electrically protected against corrosion because the reactor may be corroded with salts contained in the aqueous medium or salts optionally added in conditioning tank 92. Therefore, a low current is preferably supplied to hydrothermal oxidation reactor 350a from power source 69a. Current intensity is preferably in the range of 1 $\mu$A–50 A per 1 $dm^2$ of the inner wall area of hydrothermal electrolytic oxidation reactor 350a. Below 1 $\mu$A, sufficient cathodic corrosion protection performance cannot be obtained and therefore, electric corrosion protection cannot be attained. If the current exceeds 50 A, hydrothermal electrolysis begins to accelerate beyond the function of a hydrothermal oxidation reactor. Here, reactor 350a should be designed to ensure a proper retention time for degrading readily degradable substances.

The inner structure of hydrothermal electrolytic reactor 350b is almost the same as the inner structure of reactor 300 shown in FIG. 8, except that discharge electrode 352 in hydrothermal electrolytic reactor 350b shown in FIG. 10 extends along the overall length of the reaction cell to allow hydrothermal electrolysis all over reactor 350b.

In order to treat an aqueous medium with the treatment apparatus shown in FIG. 10, the retention time in hydrothermal oxidation reactor 350a is preferably 3 hours to 1 minute. If it exceeds 3 hours, the volume of the hydrothermal oxidation reactor excessively increases though it is preferably smaller because it is-a pressure vessel. If the retention time is less than 1 minute, however, degradation reaction insufficiently proceeds for the lack of enough time for contact between reducing substances and an oxidizer because it is an oxidative degradation reaction with low-activity molecular oxygen. When the aqueous medium is nearly free from readily degradable substances or partially oxidizable substances, however, the retention time may be 1 minute or less. The retention time here should be changed depending on the nature of reducing substances contained in the aqueous medium. This retention time is preferably determined on the basis of a separate batch hydrothermal oxidation test or the like.

Other reaction conditions in hydrothermal oxidation reactor 350a and hydrothermal electrolytic reactor 350b are similar to those described with reference to FIG. 8.

In the embodiment shown in FIG. 10, a reactor in the form shown in FIGS. 2–4 or a reactor in the form shown in FIGS. 5–7 may be appropriately used as hydrothermal electrolytic reactor 350b.

In the processes and apparatus for treating an aqueous medium according to various aspects of the present invention described above, the throughput and process efficiency of the hydrothermal electrolytic reactor can be greatly improved by incorporating electrically conductive particles into the aqueous reaction medium to substantially increase the electrode surface area in the hydrothermal electrolytic reactor.

The incorporation of electrically conductive particles into the aqueous medium means that the aqueous medium containing water and electrically conductive particles is located between the original cathode and the original anode in the hydrothermal electrolytic reactor. When a dc voltage is applied across the original cathode and the original anode, individual conductive particles serve as an anode at the surfaces facing the original cathode and as a cathode at the surfaces facing the original anode under the effect of an electric field. Therefore, a current flows locally between the original cathode and the surfaces of individual conductive particles serving as an anode, and also a current flows locally between the original anode and the surfaces of conductive particles serving as a cathode. When two conductive particles are located in proximity to but without contact with each other and the cathodic surface of one conductive particle faces the anodic surface of the other conductive particle, for example, a current flows locally between the cathodic surface and the anodic surface. This also applies to more than two discrete conductive particles, in which case a current seems to flow between the cathodic surface of a conductive particle and the anodic surface of another conductive particle.

Thus, the current flowing between the original anode and the original cathode increases and the voltage across the original anode and the original cathode also increases when conductive particles exist in the aqueous medium as compared with when no conductive particles exist in the aqueous medium. Therefore, a large amount of electric power can be supplied to the aqueous medium to greatly improve the throughput and process efficiency of the hydrothermal electrolytic apparatus without increasing the surface area of the original anode and the original cathode. During the first step of electrolysis according to the first aspect of the present invention, the presence of conductive particles in the aqueous medium also improves the throughput and process efficiency of the electrolytic apparatus.

For incorporating conductive particles into the aqueous medium in the processes and apparatus for treating an aqueous medium according to various aspects of the present invention, the aqueous medium treatment apparatus shown in FIG. 1 may be provided with a feeder not shown for supplying a controlled amount of conductive particles into aqueous medium conditioning tank 8, for example. In this case, the treated aqueous medium discharged from hydrothermal electrolytic reactor 62 contains conductive particles so that a particle separator not shown such as a cyclone is preferably provided in aqueous medium effluent line 73 to recover conductive particles contained in the treated aqueous medium. In a possible case where conductive particles still remain in the effluent discharged from gas-liquid separator 78 at the end of effluent line 73, the effluent from gas-liquid separator 78 can be further passed through a filter not shown to separate conductive particles contained therein. The conductive particles recovered from the treated aqueous medium can be recycled to hydrothermal electrolytic reactor 62 or to aqueous medium conditioning tank 8.

Conductive particles used for this purpose may be wholly formed of a conductive material. Alternatively, they may be particles of a conductive material coated with another conductive material on their surfaces or particles of a non-conductive material coated with a conductive material on their surfaces. Even particles having an insulating oxide or the like deposited on their surfaces by corrosion or other reasons are regarded as conductive particles so far as they are generally conductive.

Particles formed of a conductive material include, for example, carbon particles, metal particles and conductive oxide particles. Carbon particles include, for example, particles of graphite. Metal particles include, for example, so-called metal powders such as iron powder, copper powder, silver powder, nickel powder, cobalt powder and aluminium powder. Conductive oxide particles include particles of a ferrite and ruthenium oxide. In terms of costs, iron powder and aluminium powder are preferred. Iron powder includes powdered scrap from machining of steel (including stainless steel), cast iron or the like.

Particles of a conductive material coated with another conductive material include metal particles coated with a thin film of another metal on their surfaces such as copper particles coated with platinum on their surfaces.

Particles of a non-conductive material coated with a conductive material on their surfaces include particles of an oxide powder coated with a metal thin film on their surfaces such as aluminium oxide particles coated with copper on their surfaces.

Particles of a conductive or non-conductive oxide powder coated with a conductive oxide on their surfaces are also suitable, such as zirconium oxide particles coated with iridium oxide on their surfaces and silicon dioxide particles coated with ruthenium oxide on their surfaces.

Synthetic polymer particles coated with a metal or a conductive oxide on their surfaces are also suitable, such as polymer particles of polyethylene glycol coated with ruthenium oxide on their surfaces.

Means for coating a metal thin film include electroplating, electroless plating, sputtering, physical vapor deposition, chemical vapor deposition, etc. Means for coating a conductive oxide thin film include calcination, sputtering, physical vapor deposition, chemical vapor deposition, etc.

These conductive particles are subjected to a current in the presence of a strong acid ion such as a halide ion at high temperature and high pressure. Suitable conductive particles may be irreversible particles liable to be molten or corroded under these conditions or reusable chemically stable particles. For single use, iron powder, aluminium powder or the like are preferred in terms of costs. Reusable conductive particles preferably have such an excellent corrosion resistance that they remain insoluble even if a current is applied.

Reusable conductive particles are preferably formed of or coated with a conductive material having ruthenium, iridium, platinum, palladium, rhodium, copper, nickel, tin or an oxide thereof or a ferrite.

Ruthenium, iridium, platinum, palladium, rhodium, copper, nickel and tin may be elementary metals or oxides. Alloys of these metals are also preferably used. Such alloys include, for example, platinum-iridium, ruthenium-tin and ruthenium-titanium. In some embodiments, conductive materials based on palladium, ruthenium or an alloy of platinum and iridium are especially preferred.

Conductive particles may be in any form such as, but not limited to, sphere, rod, disk, T-shape, donut, tube, fiber, etc. Hollow particles are also suitable.

Conductive particles preferably have a size shorter than the distance between the anode and the cathode. The average size of conductive particles is preferably 1 cm or less, more preferably 5 mm or less, still more preferably 1 mm or less, most preferably 0.5 mm or less. For example, the size of spherical conductive particles means their diameter. The size of rod-like or tubular conductive particles means their length. The size of conductive particles may be homogeneous or may widely vary.

Rod-like or tubular conductive particles preferably have an aspect ratio, ie, the ratio of the length to the diameter of the rod or tube of 0.1–1000, more preferably 0.5–100.

The aqueous medium preferably contains 0.01% by weight or more of conductive particles, more preferably 0.1% by weight or more of conductive particles. The presence of conductive particles in an amount even as small as 0.01% by weight in the influent increases a current, therefore a voltage across the original electrodes.

The aqueous medium preferably contains 30% by weight or less of conductive particles, more preferably 10% by weight or less of conductive particles. If more than 30% by weight of conductive particles are contained, the fluidity of the influent is affected and the probability of a short circuit between electrodes significantly increases.

The content of conductive particles in the influent means the content in the feed line for supplying the influent into the reaction cell. This is because conductive particles are not always uniformly distributed in the reaction cell so that the content is difficult to exactly determine. When the reaction cell is tubular and the influent is transferred from the bottom to the top, for example, the concentration of conductive particles tends to be higher at the bottom of the reaction cell.

In the process and apparatus according to the first aspect of the present invention, ie, the process and apparatus for treating an aqueous medium via two steps of electrolysis/hydrothermal electrolysis, the aqueous medium may be subjected to a conventional hydrothermal oxidation treatment after it is subjected to the first step of electrolysis at a temperature of 100° C. or less and normal pressure and before it is subjected to the second step of hydrothermal electrolytic reaction, and such an embodiment is also included in the scope of the present invention. In this case, the hydrothermal reaction that can be inserted as an intermediate step between the first step of electrolysis and the second step of hydrothermal electrolysis can be performed by using the hydrothermal reaction process and apparatus as described as the first step of the process according to the second aspect of the present invention. For example, reactor 300 shown in FIG. 8 or a combination of reactors 350a and 350b shown in FIG. 10 can be used as hydrothermal electrolytic reactor 62 in the aqueous medium treatment system shown in FIG. 1 to treat an aqueous medium in the order of electrolysis/hydrothermal reaction/hydrothermal electrolysis. In this case, an oxidizer is preferably added into the reaction medium before hydrothermal reaction. Such an arrangement has the advantage that the amount of current used for hydrothermal electrolysis can be reduced because substances such as ammonia are first degraded by electrolysis, then readily degradable substances that are degradable by oxidation reaction with an oxidizer such as t-butyl alcohol, formic acid, oxalic acid, phenol, o-cresol, benzyl alcohol contained in the aqueous medium are oxidatively degraded by hydrothermal reaction, and then the remaining reducing substances in the aqueous medium are degraded by hydrothermal electrolytic reaction.

According to various aspects of the present invention described above, various reducing substances described above can be treated by degradation. Preferred influents that can be treated by the present invention other than those containing reducing substances described above include waste liquors containing lignin or a derivative thereof such as waste liquor discharged from pulp plants.

Generally, waste liquor discharged from pulp plants contains a lot of lignin with very high TOC, BOD and COD. Lignin is one of main components of ligneous plants such as wood, bamboo, straw, and represents a network polymer compound consisting of fused blocks having phenylpropane as skeleton.

During the preparation of pulp in pulp plants or the like, a raw plant material such as wood is digested with a chemical at 1–5 atm and 90–160° C. to separate lignin from cellulose. Pulping processes include the sulfate pulping (kraft pulping) process using sodium sulfide and sodium hydroxide and the sulfite pulping process using sulfites (such as sodium sulfite, ammonium sulfite, magnesium sulfite, calcium sulfite). Lignin contained in digestion waste liquor (hereinafter referred to as pulp waste liquor) is dissolved in the form of thiolignin in the case of the kraft pulping process or in the form of lignin sulfonate in the case of the sulfite pulping process. These pulp-waste liquors contain hexose, pentose, sugar derivatives, volatile organics, inorganic compounds or the like in addition to lignin derivatives.

Pulp waste liquor is typically treated by the concentration/ burning process. This concentration/burning process involves concentrating combustible materials in pulp waste liquor 5 to 10 fold using a concentrator such as a multipurpose vacuum chamber and then burning the concentrates in a spray combustion furnace having a steam recovery mechanism such as a boiler. However, this concentration/burning process has the disadvantage that enormous heat is required to concentrate water (about 90%) contained in pulp waste liquor to a combustible level.

Another disadvantage is that volatile malodorous components are also produced with water vapor during concentration. A separate condensed water treatment equipment is required to remove these volatile malodorous components, which increases plant investment.

Still another disadvantage is that malodorous components such as methyl sulfite, hydrogen sulfide, methyl mercaptan are also produced during the pulp digestion process. A separate gas treatment equipment is required to remove these malodorous components, which also increases plant investment.

As an alternative process for treating pulp waste liquor, the hydrothermal oxidation process (also called wet oxidation or Zimmerman process) has been proposed. This hydrothermal oxidation process involves oxidizing a water-rich solution such as pulp waste liquor in the liquid phase in a temperature range of about a 200–300° C. in the presence of an oxidizer such as air under an appropriate pressure that prevents evaporation of water. However, persistent lower aliphatic acids such as acetic acid are scarcely degraded and pulp waste liquor;cannot be thoroughly treated by this hydrothermal oxidation process alone.

We found that the process and apparatus for treating an aqueous medium according to the second aspect of the present invention comprising a first step of hydrothermal reaction and a second step of hydrothermal electrolytic reaction can be used as means for treating such pulp waste liquor to conveniently and very efficiently degrade an influent containing lignin or a derivative thereof such as pulp waste liquor at low costs.

To treat pulp waste liquor according to the second aspect of the present invention, a pulp waste liquor feed line or a water feed line are provided in aqueous medium conditioning tank 92 in the treatment apparatus shown in FIG. 8 or 10, for example, In this case, aqueous medium conditioning tank 92 preferably has a basically closed structure except for a respiration vent not shown because pulp waste liquor often contains malodorous components, especially sulfur components (hydrogen sulfide, methyl mercaptan). Preferably, a strong electrolyte feed line is further provided in aqueous medium conditioning tank 92 to incorporate a strong electrolyte into the aqueous medium.

Preferred such strong electrolytes include salts capable of being dissolved in aqueous media such as halide salts, sulfates, phosphates. Especially preferred are halide salts. In this case, the halide salt level is preferably in the range of 50 ppm–20 wt %. Preferred halide ion sources include common salt, rock salt, potassium chloride, potassium bromide, sodium bromide or other halogen salts.

This strong electrolyte acts as a catalyst during the later hydrothermal electrolysis step, and is added in a solid or liquid state. Suitable solid strong electrolyte sources include, for example, common salt, rock salt, potassium chloride, potassium bromide, sodium bromide or other halogen salts. These solid strong electrolyte sources are added to aqueous medium conditioning tank 92 in such a manner that the strong electrolyte level in aqueous medium conditioning tank 92 becomes in the range of 50 ppm–20 wt %. In some pulp plants, pulp waste liquor contains digestion waste liquor and bleaching waste liquor. When this bleaching waste liquor is contained, the dose of a strong electrolyte source may be lower because pulp waste liquor already contains chlorine ion.

Water supplied to the aqueous medium conditioning tank is used to maintain pulp waste liquor at a proper combustible level. Pulp waste liquor typically contains about 10% of combustible materials, though the minimum combustible level at which the reaction temperature can be maintained by autogenous combustion during hydrothermal oxidation is about 1%. Thus, 9% or more of combustible materials generate extra heat. However, the reaction temperature may uncontrollably rise if these excessive combustible materials are wholly introduced into the hydrothermal oxidation reactor or the hydrothermal electrolytic reactor. Therefore, it is preferred that pulp waste liquor is preconditioned in aqueous medium conditioning tank 92 to keep a proper content of combustible materials for safe operation, and then introduced into the hydrothermal oxidation reactor or the hydrothermal electrolytic reactor.

When the process and apparatus according to the second aspect of the present invention are used for the treatment of lignin or a derivative thereof derived from pulp waste liquor, it is more preferred that the first step of hydrothermal oxidation reaction is preceded by the step of supplying an oxidizer and the step of adding a gas containing malodorous components derived from pulp waste liquor to this oxidizer supplying step. In this case, not only waste liquor but also exhaust gas can be treated.

Typically, pulp waste liquor often contains fine particles, such as fine $SiO_2$ (silica) especially when straw is used as a pulp material. Thus, it is preferred that a filter device is provided on the effluent line of the treated aqueous medium discharged from the hydrothermal electrolytic reactor to separate fine particles contained in the treated aqueous medium when the process and apparatus for treating an aqueous medium according to the second aspect of the present invention are used for the treatment of lignin or a derivative thereof derived from pulp waste liquor. For example, the effluent discharged from gas-liquid separator 78 in the aqueous medium treatment apparatus shown FIG. 8 or 10 can be further passed through a filter device to separate fine particles contained in the liquid. Especially when $SiO_2$ particles are contained in pulp waste liquor, these $SiO_2$ particles are not specifically converted during the hydrothermal oxidation reaction step and hydrothermal electrolysis step. Thus, a filter device can be used to retain and recover silica particles at relatively high purity so that they can be recycled for various ceramic materials or semiconductor materials. The liquid introduced into effluent tank 86 contains the electrolyte material added as a strong electrolyte source, which remains unchanged and can be then returned to aqueous medium conditioning tank 92 and reused as a diluent for pulp waste liquor and an electrolyte source, whereby the amount of water and strong electrolyte source to be externally added can be reduced.

The foregoing description relates to various aspects of the present invention. In the following, some aspects are more specifically explained by way of examples. However, the following examples are intended to only illustrate some specific embodiments of the present invention without limiting the present invention thereto.

Comparative Example 1

This comparative example relates to a conventional process for treating an aqueous medium containing reducing substances via one-step reaction of hydrothermal electrolysis.

Figure 11:
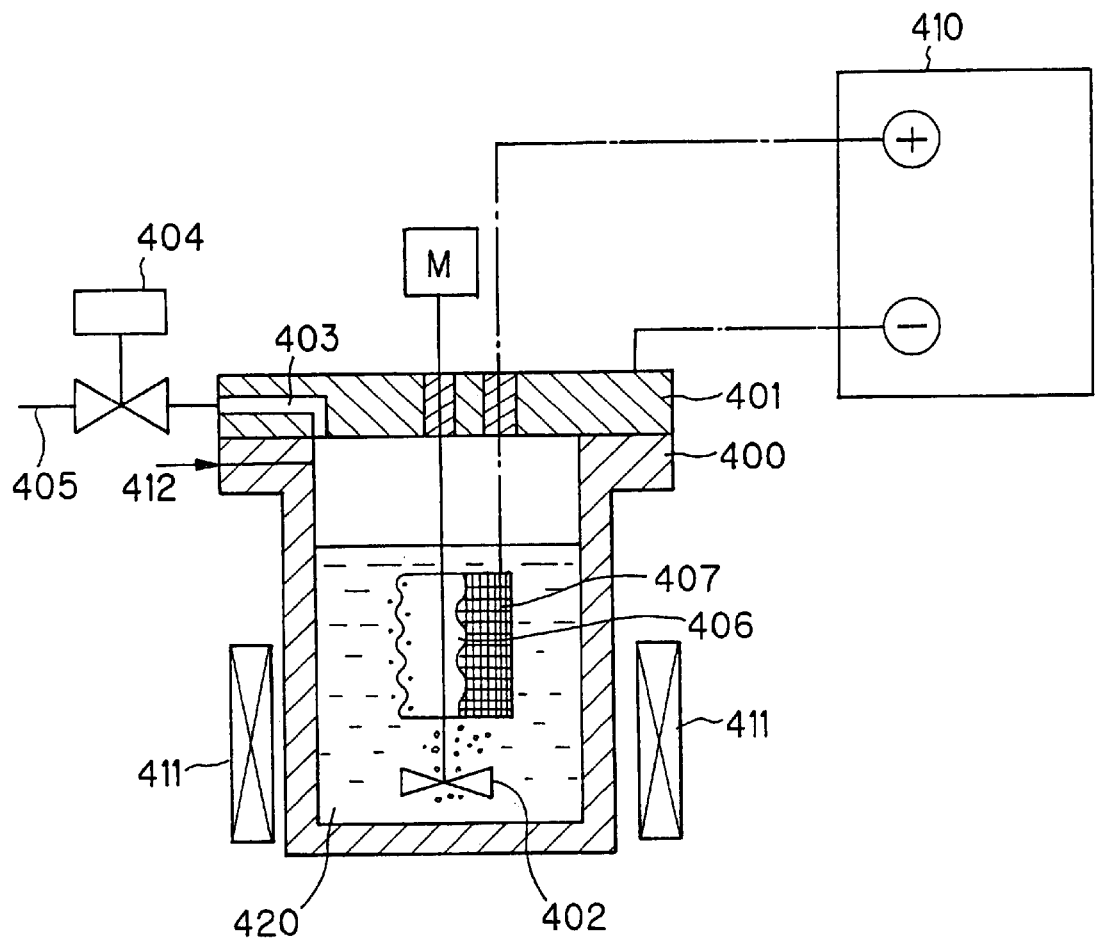
FIG. 11 is a schematic view of the experimental apparatus used in the examples of the present invention and comparative examples.

Experiments were made using an autoclave shown in FIG. 11. The autoclave consists of a container body 400 made from SUS304 and a cover 401, and has an inner volume of 300 ml. An exhaust port 403 is formed in cover 401 and connected to an exhaust pipe 405 having a valve 404. The container also has a gas inlet 412 for introducing a purge gas.

A ruthenium oxide ($RuO_2$) sintered electrode 406 was placed in the autoclave. Electrode 406 consists of a cylindrically shaped mesh member 407. Electrode 406 was connected to the cathode of an outer power source 410, and cover 401 was connected to the anode of the outer power source so that the inner wall face of the container body served as a cathode. At room temperature, 150 ml of organic sludge 420 was introduced into the autoclave and the container was sealed and filled with argon gas in an amount equivalent to 70 atm. Main properties of the organic sludge used are shown in Table 1. NaCl was added to the organic sludge at a chloride ion concentration of 10 mmol/L. The content 420 was heated to 250° C. by a heater 411 under agitation with a stirring impeller 402, and an electrolytic current of 6A was applied to perform hydrothermal electrolytic reaction for 2 hours.

After current application for 2 hours, power supply to heater 411 and electrodes was stopped and the autoclave was rapidly cooled to room temperature. The gas in the container and the effluent were recovered and analyzed. The analysis results are shown in Table 1. The effluent gas was odorless, and the effluent (supernatant) was clear. The TOC and COD in the supernatant of the effluent were 986 mg/L and 396 mg/L, respectively.

EXAMPLE 1

This example relates to a process according to the first aspect comprising a first step of electrolysis and a second step of hydrothermal electrolysis. Before the hydrothermal electrolysis of Comparative example 1, an electrolytic reaction was performed at normal pressure. In the same autoclave as used in Comparative example 1 shown in FIG. 11 containing sludge having a chloride ion level controlled at 10 mmol/L, an electrolytic current of 6A was applied across ruthenium oxide sintered electrode 406 and the inner face of the container (cathode) for 2 hours while the container was purged with argon via valve 404 opened.

Then, the autoclave was charged with argon in an amount equivalent to 7 MPa, and sealed and heated to a temperature of 250° C. When the temperature reached 250° C., an electrolytic current of 6 A was applied across electrodes for 2 hours. The experimental results are shown in Table 1. Remarkable improvement in TOC and COD in the supernatant was found as compared with Comparative example 1 in which the first step of electrolysis was omitted.

TABLE 1

|  | Stock solution | Comparative example 1 | Example 1 |
| --- | --- | --- | --- |
| First step of electrolysis |  |  |  |
| Temperature (° C.) | — | — | 40 |
| Pressure (atm) | — | — | Normal |
| Electrolytic current (A) | — | — | 6 |
| Reaction time (h) | — | — | 2 |
| Oxygen (atm) | — | — | 0 |
| Second step of electrolysis |  |  |  |
| Temperature (° C.) | — | 250 | 250 |
| Pressure (atm) | — | 70 | 70 |
| Electrolytic current (A) | — | 6 | 6 |
| Reaction time (h) | — | 2 | 2 |
| Oxygen (atm) | — | 0 | 0 |
| MLSS (mg/L) | 12,000 | 2,988 | 1,896 |
| MLVSS (mg/L) | 9,800 | 1,300 | 451 |
| TOC (mg/L) | 10 | 986 | 54 |
| COD (mg/L) | 5.4 | 396 | 30 |
| pH | 7.3 | 4.71 | 4.8 |
| Color of the supernatant | Clear | Clear | Clear |
| Odor of effluent gas | No | No | No |
| Corrosion in the container | — | No | No |

*MLSS: mixed liquor suspended solid;
MLVSS: mixed liquor volatile suspended solid.

EXAMPLE 2

This Example 2 and the following Example 3 relate to a process according to the second aspect of the present invention comprising a first step of hydrothermal reaction and a second step of hydrothermal electrolysis. In Examples 2 and 3, the apparatus shown in FIG. 10 was used. Acetic acid was used a persistent substance, and formic acid was used as a readily degradable substance. Commercially available acetic acid and formic acid were diluted in distilled water each at 4,000 mg/L to prepare an artificial waste liquor. A reagent grade NaCl was further added as a halide ion source at an NaCl concentration of 2 wt % in the waste liquor. TOC of the waste liquor was 2,640 mg/L.

The flow rate of high-pressure pump 94 was set at 100 cc/min (6 L/h), and the flow rate of the compressor for introducing air was set at 5 NL/min (0.3 m³/h). A cylindrical iridium sintered electrode 351 was placed in hydrothermal oxidation reactor 350a having an inner volume of 6 L. A cylindrical iridium sintered electrode 352 was placed in hydrothermal electrolytic reactor 350b also having an inner volume of 6 L. Hydrothermal oxidation reactor 350a and hydrothermal electrolytic reactor 350b were connected in series as shown FIG. 10.

Experiments started with charging hydrothermal oxidation reactor 350a and hydrothermal electrolytic reactor 350b with tap water connected to the suction of high-pressure pump 94 and pumped at 100 cc/min via. Then, back-pressure valve 97 was set at 7 MPa to pressurize hydrothermal oxidation reactor 350a and hydrothermal electrolytic reactor 350b to 7 MPa while pumping 5 NL/min air and 100 cc/min tap water. Valve 96a and valve 96b were controlled to introduce air at about 2 L/min into hydrothermal oxidation reactor 350a and at about 3 L/min into hydrothermal electrolytic reactor 350b. Then, an electric heater not shown provided around hydrothermal oxidation reactor 350a and hydrothermal electrolytic reactor 350b was activated under circulation of air and tap water to heat each reactor to 250° C. under the control of a temperature controlling thermocouple not shown provided at the top of each reactor so that the temperature of each reactor was controlled at a constant temperature of 250° C. After the conditions of 7 MPa and 250° C. were reached, tap water was switched to pulp waste liquor and a current of 0.1 A and a current of 40 A were applied to hydrothermal oxidation reactor 350a and hydrothermal electrolytic reactor 350b, respectively. After continuous operation for 3 hours under these conditions, the water quality of the effluent became stable. TOC at the exit of hydrothermal oxidation reactor 350a was 1,690 mg/L (TOC degradation 36.0%) and TOC at the exit of hydrothermal electrolytic reactor 350b was 80 mg/L (TOC degradation 97.0%).

This means that formic acid representative of a readily degradable substance which can be degraded with an inexpensive oxidizer air alone was degraded by hydrothermal oxidation and that persistent acetic acid was degraded with an oxidizer produced in a relatively expensive but effective electrochemical reaction. Thus, it was shown that the process according to the second aspect of the present invention can reduce electric power for hydrothermal electrolysis to save the costs for treating waste liquors.

EXAMPLE 3

Experiments were made under the same conditions as in Example 2 except that valve 96a was completely closed and valve 96b was completely opened to shut air to hydrothermal oxidation reactor 350a and send 5 L/min air solely to hydrothermal electrolytic reactor 350b. That is, hydrothermal electrolysis was preceded by the conventional hydrothermal reaction without using an external oxidizer in this Example 3. As a result, TOC at the exit of hydrothermal oxidation reactor 350a was 2570 mg/L (TOC degradation 2.6%) and TOC at the exit of hydrothermal electrolytic reactor 350b was 764 mg/L (TOC degradation 71%).

EXAMPLE 4

This example relates to a process for treating pulp waste liquor containing lignin using an aqueous medium treatment apparatus according to the second aspect of the present invention. The apparatus shown in FIG. 10 was used to perform experiments for treating an artificial pulp waste liquor containing lignin. The artificial pulp waste liquor used here was prepared by dissolving commercially available soluble sodium lignin sulfonate powder in distilled water at a concentration of 2.5 g/l.

This artificial pulp waste liquor was introduced into aqueous medium conditioning tank 92 and a strong electrolyte source NaCl and water were added to aqueous medium conditioning tank 92 at an NaCl concentration of 2 wt % in the artificial pulp waste liquor. As the sulfone group of lignin sulfonate is stabilized as sulfuric acid after oxidation reaction, NaOH was added as a neutralizing agent at an NaOH concentration of 0.7 g/l in the artificial pulp waste liquor.

The artificial pulp waste liquor here showed a TOC of 950 mg/l, a pH of 12.09 and a dark brown to black color.

The flow rate of pressure pump 94 in aqueous medium feed line 90 was set at 100 cc/min (6 l/h), and the flow rate of first compressor 51 in oxidizer feed line 55 was set at 5 Nl/min (0.3 m³/h). Air was used as an oxidizer.

Hydrothermal oxidation reactor 350a had an inner volume of 6 l and was provided with a cylindrical iridium sintered electrode as a corrosion resistant electrode 351. Hydrothermal electrolytic reactor 350b had an inner volume of 6 l and was provided with a cylindrical iridium sintered electrode as a discharge electrode 352. Hydrothermal oxidation reactor 350a and hydrothermal electrolytic reactor 350b were connected in series as shown in FIG. 10.

Before said artificial pulp waste liquor was treated, environmental conditions for hydrothermal oxidation reactor 350a and hydrothermal electrolytic reactor 350b were established to suit process conditions. Hydrothermal oxidation reactor 350a and hydrothermal electrolytic reactor 350b were charged with tap water connected to the suction of the high-pressure pump and pumped at 100 cc/min, and then back-pressure valve 97 was set at 7 MPa to pressurize hydrothermal oxidation reactor 350a and hydrothermal electrolytic reactor 350b to 7 MPa while pumping 5 Nl/min air and 100 cc/min tap water. Then, an electric heater not shown provided around hydrothermal oxidation reactor 350a and hydrothermal electrolytic reactor 350b was activated under circulation of air and tap water to heat each reactor to 250° C. under the control of a temperature controlling thermocouple not shown provided at the top of each of reactors 350a and 350b to 250° C. so that the temperature of each reactor was controlled at a constant temperature of 250° C., whereby environmental condition setting was completed. After the conditions of 7 MPa and 250° C. were reached, tap water injection was stopped and supply of an aqueous medium containing the artificial pulp waste liquor was started and current application of 0.1 A to hydrothermal oxidation reactor 350a and 20 A to hydrothermal electrolytic reactor 350b was started.

After continuous operation for 3 hours under feeding with the aqueous medium, the water quality of the effluent discharged on effluent line 73 became stable. At the exit of hydrothermal oxidation reactor 350a, the effluent was yellow and had a TOC of 421 mg/l (TOC degradation 55.7%) and a pH of 5.71. At the exit of hydrothermal electrolytic reactor 350b, the effluent was colorless and clear and showed a TOC of 14 mg/l (TOC degradation 98.5%) and a pH of 5.50.

These experimental results showed that lignin was degraded very well by the process according to the second aspect of the present invention.

INDUSTRIAL APPLICABILITY

According to the processes and apparatus for treating an aqueous medium according to the first and second aspects of the present invention as has been described in detail, reducing substances contained in the aqueous medium can be efficiently degraded because substances that can be degraded by conventional electrolysis or hydrothermal reaction are first degraded and then the remaining reducing substances contained in the aqueous medium are degraded by hydrothermal electrolytic reaction, thereby overcoming the problem with hydrothermal electrolysis that the improvement in process efficiency is limited by the constraint of the structure of the reaction vessel, which hinders the increase of electricity in hydrothermal electrolysis. The process according to the second aspect of the present invention is especially useful for treating pulp waste liquor containing lignin or the like.

What is claimed is:

1. A process for treating an aqueous medium comprising:
    a first step of subjecting an aqueous medium containing water, reducing substances and a halide ion to electrolytic reaction under the conditions of a temperature of 100° C. or less and atmospheric pressure, and then
    a second step of performing hydrothermal electrolysis by supplying a direct current to said aqueous medium at a temperature of 100° C. or more but not more than the critical temperature of said aqueous medium and at a pressure that allows said aqueous medium to be kept in the liquid phase.

2. The process of claim 1 comprising adding an oxidizer to the aqueous medium after the first step of electrolytic reaction and before the second step of hydrothermal electrolysis.

3. The process of claim 2 wherein air is added as said oxidizer.

4. The process of claim 1 comprising subjecting the aqueous medium to a hydrothermal oxidation reaction by maintaining the aqueous medium in the presence of an oxidizer at a temperature of 100° C. or more but not more than the critical temperature of said aqueous medium and at a pressure that allows said aqueous medium to be kept in the liquid phase, after the first step of electrolytic reaction and before the second step of hydrothermal electrolysis, and then subjecting said aqueous medium to hydrothermal electrolysis.

5. The process of claim 4 comprising adding an oxidizer to the aqueous medium after the first step of electrolytic reaction but before the hydrothermal oxidation reaction and after the hydrothermal oxidation reaction but before the hydrothermal electrolysis step.

6. The process of claim 1 wherein said aqueous medium contains a strong acid ion in addition to a halide ion.

7. The process of claim 1 comprising adding conductive particles to the aqueous medium.

8. The process of claim 1 for treating lignin or a derivative thereof.

9. An apparatus for treating an aqueous medium comprising:
    an electrolytic reactor having a vessel for receiving an aqueous medium and at least a pair of electrodes for performing electrolysis in said vessel, and
    a hydrothermal electrolytic reactor having a reactor having an inlet for introducing the aqueous medium treated by said electrolytic reactor and an outlet for discharging effluent and capable of resisting the pressure of hydrothermal reaction, and at least a pair of electrodes for performing electrolysis in said reactor.

10. The apparatus of claim 9 further comprising a heater for heating the reactor of the hydrothermal electrolytic reactor.

11. The apparatus of claim 9 wherein the reactor of the hydrothermal electrolytic reactor further comprises a means for introducing an oxidizer into the reactor.

12. The apparatus of claim 11 wherein said means for introducing an oxidizer is a nozzle for mixing an aqueous medium and an oxidizer.

13. The apparatus of claim 9 further comprising a means for heating the aqueous medium before introducing the aqueous medium into the reactor of the hydrothermal electrolytic reactor.

14. The apparatus of claim 9 wherein the hydrothermal electrolytic reactor comprises a hydrothermal oxidation reaction part for maintaining the aqueous medium at a temperature of 100° C. or more but not more than the critical temperature of said aqueous medium and at a pressure that allows said aqueous medium to be kept in the liquid phase, and a hydrothermal electrolysis part for supplying a direct current to the aqueous medium treated in said hydrothermal oxidation reaction part at a temperature of 100° C. or more but not more than the critical temperature of said aqueous medium and at a pressure that allows said aqueous medium to be kept in the liquid phase.

15. The apparatus of claim 14 wherein said hydrothermal oxidation reaction part and said hydrothermal electrolysis part are provided in one reactor.

16. The apparatus of claim 14 wherein said hydrothermal oxidation reaction part and said hydrothermal electrolysis part are provided in separate reactors.

17. The apparatus of claim 9 wherein the reactor of the hydrothermal electrolytic reactor has a multitube structure consisting of a plurality of containers and an electrode is provided in each container.

18. The apparatus of claim 9 wherein the reactor of the hydrothermal electrolytic reactor has a pair of electrodes comprising:
    a first electrode having two or more concentrically cylindrical first side walls and a first connecting member for connecting said first side walls together, and
    a second electrode having two or more concentrically cylindrical second side walls and a second connecting member for connecting said second side walls together,
    wherein said first side walls of said first electrode and said second side walls of said second electrode are alternately arranged to form a channel for influent between said first side walls and said second side walls.

19. The apparatus of claim 9 further comprising a conductive particle feed line for adding conductive particles to the aqueous medium.

20. The process of claim 19 comprising the step of adding conductive particles into the aqueous medium.

21. The apparatus of claim 20 further comprising a conductive particle feed line for adding conductive particles to the aqueous medium.

22. The apparatus of claim 9 comprising a feed line for introducing lignin or a derivative thereof into the aqueous medium.

23. A process for treating an aqueous medium comprising:
    a hydrothermal reaction step of maintaining an aqueous medium containing water and reducing substances at a temperature of 100° C. or more but not more than the critical temperature of said aqueous medium and at a pressure that allows said aqueous medium to be kept in the liquid phase, and then
    a hydrothermal electrolytic step of supplying a direct current to said aqueous medium at a temperature of 100° C. or more but not more than the critical temperature of said aqueous medium and at a pressure that allows said aqueous medium to be kept in the liquid phase.

24. The process of claim 23 wherein the aqueous medium further contains an oxidizer in the hydrothermal reaction step.

25. The process of claim 23 wherein said aqueous medium further contains a strong acid ion in said hydrothermal electrolysis step.

26. The process of claim 23 for treating lignin or a derivative thereof.

27. An apparatus for treating an aqueous medium comprising:
 a hydrothermal reaction part for maintaining an aqueous medium containing water and reducing substances at a temperature of 100° C. or more but not more than the critical temperature of said aqueous medium and at a pressure that allows said aqueous medium to be kept in the liquid phase, and
 a hydrothermal electrolytic reaction part for supplying a direct current to the aqueous medium treated in said hydrothermal reaction part at a temperature of 100° C. or more but not more than the critical temperature of said aqueous medium and at a pressure that allows said aqueous medium to be kept in the liquid phase.

28. The apparatus of claim 27 wherein said hydrothermal reaction part and said hydrothermal electrolysis part are provided in one reactor.

29. The apparatus of claim 27 wherein said hydrothermal reaction part and said hydrothermal electrolysis part are provided in separate reactors.

30. The apparatus of claim 29 wherein the reactor of the hydrothermal electrolysis part has a pair of electrodes comprising:
 a first electrode having two or more concentrically cylindrical first side walls and a first connecting member for connecting said first side walls together, and
 a second electrode having two or more concentrically cylindrical second side walls and a second connecting member for connecting said second side walls together,
 wherein said first side walls of said first electrode and said second side walls of said second electrode are alternately arranged to form a channel for influent between said first side walls and said second side walls.

31. The apparatus of claim 27 wherein the reactor has a multitube structure consisting of a plurality of containers.

32. The apparatus of claim 27 comprising a feed line for introducing lignin or a derivative thereof into the aqueous medium.

33. A process for treating an aqueous medium comprising:
 a first step of subjecting an aqueous medium containing water, reducing substances and a strong acid ion to electrolytic reaction under the conditions of a temperature of 100° C. or less and atmospheric pressure, and then
 a second step of performing hydrothermal electrolysis by supplying a direct current to said aqueous medium at a temperature of 100° C. or more but not more than the critical temperature of said aqueous medium and at a pressure that allows said aqueous medium to be kept in the liquid phase.

* * * * *

UNITED STATES PATENT AND TRADEMARK OFFICE
CERTIFICATE OF CORRECTION

PATENT NO. : 6,572,759 B1
DATED : June 3, 2003
INVENTOR(S) : Tatsuya Nishimura et al.

It is certified that error appears in the above-identified patent and that said Letters Patent is hereby corrected as shown below:

<u>Title page,</u>
Item [75], Inventor, change the name of the third inventor to -- Qingquan Su --.

Signed and Sealed this

Twenty-eighth Day of October, 2003

JAMES E. ROGAN
*Director of the United States Patent and Trademark Office*